(12) United States Patent
Hsu

(10) Patent No.: US 11,568,151 B2
(45) Date of Patent: Jan. 31, 2023

(54) NATURAL LANGUAGE PROCESSING METHOD AND COMPUTING APPARATUS THEREOF

(71) Applicant: ACADEMIA SINICA, Taipei (TW)

(72) Inventor: Wen-Lian Hsu, New Taipei (TW)

(73) Assignee: ACADEMIA SINICA, Taipei (TW)

( * ) Notice: Subject to any disclaimer, the term of this patent is extended or adjusted under 35 U.S.C. 154(b) by 189 days.

(21) Appl. No.: 17/099,867

(22) Filed: Nov. 17, 2020

(65) Prior Publication Data

US 2021/0150148 A1 May 20, 2021

Related U.S. Application Data

(60) Provisional application No. 62/937,961, filed on Nov. 20, 2019.

(51) Int. Cl.
*G06F 40/30* (2020.01)
*G06F 40/295* (2020.01)
*G06F 40/58* (2020.01)
*G06F 40/284* (2020.01)
*G06F 40/253* (2020.01)
*G06F 40/263* (2020.01)

(52) U.S. Cl.
CPC ............ *G06F 40/30* (2020.01); *G06F 40/253* (2020.01); *G06F 40/263* (2020.01); *G06F 40/284* (2020.01); *G06F 40/295* (2020.01); *G06F 40/58* (2020.01)

(58) Field of Classification Search
CPC ...... G06F 40/30; G06F 40/253; G06F 40/284; G06F 40/58; G06F 40/263; G06F 40/295

USPC .................................... 704/2–4, 7–10, 257
See application file for complete search history.

(56) References Cited

U.S. PATENT DOCUMENTS

| | | | | |
|---|---|---|---|---|
| 10,699,077 B2* | 6/2020 | Mehdad | ................ | G06F 40/295 |
| 2004/0083092 A1* | 4/2004 | Valles | ..................... | G06F 40/30 |
| | | | | 704/9 |
| 2005/0075859 A1* | 4/2005 | Ramsey | ................ | G06F 40/216 |
| | | | | 704/9 |
| 2011/0184718 A1* | 7/2011 | Chen | ....................... | G06F 40/55 |
| | | | | 704/9 |
| 2012/0316862 A1* | 12/2012 | Sultan | ..................... | G06F 40/53 |
| | | | | 704/4 |
| 2013/0185053 A1* | 7/2013 | Hsu | ....................... | G06F 40/274 |
| | | | | 704/8 |
| 2014/0114649 A1* | 4/2014 | Zuev | ....................... | G06F 16/93 |
| | | | | 704/9 |
| 2014/0214401 A1* | 7/2014 | Li | ......................... | G06F 40/232 |
| | | | | 704/8 |

(Continued)

*Primary Examiner* — Leonard Saint-Cyr
(74) *Attorney, Agent, or Firm* — WPAT, PC

(57) ABSTRACT

A natural language processing method, comprising: receiving multiple input words; and reducing the multiple words into one or more subject word data structures according to sets stored in a database, wherein one of the subject word data structures includes a first input word and a second input words among the input words, wherein one of the sets includes a compatible relation between the first input word and the second input word, wherein the compatible relation between the first input word and the second word includes a compatible property for denoting an intensity representing occurrences of the first input word and the second word in a training corpus.

20 Claims, 21 Drawing Sheets

(56) References Cited

U.S. PATENT DOCUMENTS

| | | | |
|---|---|---|---|
| 2015/0347385 A1* | 12/2015 | Flor | G06F 40/284 |
| | | | 704/9 |
| 2015/0370778 A1* | 12/2015 | Tremblay | G06F 40/56 |
| | | | 704/9 |
| 2016/0147736 A1* | 5/2016 | Danielyan | G06F 40/30 |
| | | | 704/9 |
| 2016/0283525 A1* | 9/2016 | Farenden | G06F 16/18 |
| 2017/0255603 A1* | 9/2017 | Kajinaga | G06F 40/137 |
| 2018/0052817 A1* | 2/2018 | Bethard | G06F 40/30 |
| 2018/0196800 A1* | 7/2018 | Volkovs | G06N 3/04 |
| 2018/0203843 A1* | 7/2018 | Mehdad | G06F 40/295 |
| 2018/0225372 A1* | 8/2018 | Lecue | G06N 7/005 |
| 2018/0253420 A1* | 9/2018 | Komachi | G06F 40/56 |
| 2018/0260475 A1* | 9/2018 | Zhang | G06F 40/205 |
| 2018/0293978 A1* | 10/2018 | Sinha | G06F 40/232 |
| 2018/0322111 A1* | 11/2018 | New | G06F 40/40 |
| 2019/0087412 A1* | 3/2019 | Seyed Ibrahim | G06F 40/30 |
| 2019/0102701 A1* | 4/2019 | Singaraju | G06F 16/3331 |
| 2019/0129732 A1* | 5/2019 | Sivertson | G06N 7/005 |
| 2019/0243831 A1* | 8/2019 | Rumiantsau | G06F 16/24522 |
| 2019/0340294 A1* | 11/2019 | Spangler | G06F 16/36 |

* cited by examiner

Xiao-ming da suan ming tian gei Xiao-hwua mei gong jin 100 yuan de fu shi ping guo liang ge modifiers of verb "gei" (give)

da suan ming tian gei

"gei" (give)
  time ("ming tian" tomorrow)
  will ("da suan")

frame of verb "gei" (give)

Xiao-ming gives Xiao-hwua apples

Xiao-ming
  "gei" give
    target (Xiao-hwua)
    possession ("ping guo" apple)

integrating all information to generate an incidence map

Xiao-ming
  "gei" give
    target (Xiao-hwua)
    possession ("ping guo" apple)
    quantity ("liang ge" two)
    unit price ("mei gong jin 100 yuan" 100 dollar/kilogram)
    brand ("Fu shi" Fuji)
    will ("da suan")
    time ("ming tian")

FIG. 2

NATURAL LANGUAGE PROCESSING METHOD AND COMPUTING APPARATUS THEREOF

CROSS REFERENCE TO RELATED PATENT APPLICATION

This patent application claims benefits of U.S. provisional patent application No. 62/937,961 filed on Nov. 20, 2019.

FIELD OF THE INVENTION

The present invention relates to natural language processing, and more particularly, to a reduction method realized by computer for natural language processing.

BACKGROUND OF THE INVENTION

Traditional natural language analysis tools (e.g. parser, Chinese word segmentation) emphasize grammar. However, grammars of some languages (e.g. Chinese) are quite loose. Spoken languages on the Internet have a lot of omissions, changes of order and ungrammatical sentences. Parsing systems trained with regular academic trainings have difficulties to deal with them. It must consider a lot of semantic information to correctly parse and to understand the semantics. Even the basic Chinese segmentation system may make many inexplicable errors. For example: "yi tai da bing xiang; hai yao ji zhang cai you?" (Segmentation errors are caused by two proper nouns "tai da" and "zhang cai".)

Voice inputs and outputs of natural languages already became important input and output interfaces of modern electronics, which are one of human-machine interfaces for controlling computers. Hence, there exists a need of a method for accurately judging semantic meanings of sentences, in order to correctly select words according to inputted syllables, to parse ungrammatical verbal languages for accurately machine translations or to output execution results in natural language.

SUMMARY OF THE INVENTION

In order to perform more precisely semantic analysis of natural language for finding accurate semantic meanings among multiple plausible semantic meanings, the present application provides a natural language processing method and a computing apparatus thereof for recursively reducing the input words into a semantic structure consisting of dependence parse trees according to compatible relations and label sequences stored in the database. If the semantic structure can be successfully generated, it represents that the analyzed semantic meaning is not wrong.

Since the compatible relations of words are stored or not in the database is predetermined, the execution result of the natural language processing method by the computing apparatus is deterministic. Besides, the reductions are done in a recursive way, not in an elaborated way to consider all possibilities. Thus it can decrease the computing complexity of the natural language processing method. Moreover, the reductions of the natural language processing method do not only use combinations of lexical categories, and not limited to use frequencies or number of occurrences of N-gram consisting of N adjacent words, but also take advantages of compatible relations of the semantic context in a domain, such that the semantic structure can be meaningful.

According to an aspect of the present invention. According to one aspect of the present application, providing a natural language processing method, comprising: receiving multiple input words; and reducing the multiple words into one or more subject word data structures according to sets stored in a database, wherein one of the subject word data structures includes a first input word and a second input words among the input words, wherein one of the sets includes a compatible relation between the first input word and the second input word, wherein the compatible relation between the first input word and the second word includes a compatible property for denoting an intensity representing occurrences of the first input word and the second word in a training corpus.

In one embodiment, in order to reduce a subject word with multiple compatible words, wherein one of the subject word data structure includes a third input word among the input words, wherein another one of the sets includes a compatible relation between the second input word and the third input word, wherein the subject word data structure includes a tree structure, the first input word is a root node of the tree structure, the second input word is a child node of the first input word, the third input word is a child node of the second input word.

In one embodiment, in order to reduce a subject word with phrase or clause, wherein one of the subject word data structure includes a third input word among the input words, wherein another one of the sets includes a compatible relation between the first input word and the third input word, wherein the subject word data structure includes a tree structure, the first input word is a root node of the tree structure, the second input word is a child node of the first input word, the third input word is a child node of the first input word.

In one embodiment, in order to supplement insufficient compatible relations stored in the database, ontology is used to form compatible relations, wherein another one of the subject word data structure includes a third input word and a fourth input word among the input words, wherein the third input word and the four input word are respectively corresponding to a same level or adjacent hierarchical levels of ontology, wherein the sets do not include a compatible relation between the third input word and the fourth input word.

In one embodiment, in order to recognize and reduce named entity, time phrase, spatial phrase or fixed formatted context, wherein another one of the subject data word structures includes a named entity which sequentially consisting of a third input word and a fourth input word among the input words, wherein a third set of the sets includes a compatible relation between the third input word and a third label, a fourth set of the sets includes a compatible relation between the fourth input word and a fourth label, the database further includes a label sequence which is an orderly sequence consisting of the third label and the fourth label.

In one embodiment, in order to recognize and reduce recursively formatted named entity, time phrase, spatial phrase or fixed formatted context, wherein another one of the subject data word structures includes a named entity which sequentially consisting of a third input word, a fourth input word and a fifth input word among the input words, wherein a third set of the sets includes a compatible relation between the third input word and a third label, a fourth set of the sets includes a compatible relation between the fourth input word and a fourth label, a fifth set of the sets includes a compatible relation between the fifth input word and a fifth label, the database further includes a first label sequence and a second label sequence, the first label sequence is an orderly sequence consisting of the third label and the second label sequence, the second sequence is an orderly sequence consisting of the fourth label and the fifth label.

In one embodiment, in order to reduce named entity with unknown words, wherein another one of the subject data word structures includes a named entity which sequentially consisting of a third input word, a fourth input word and a fifth input word among the input words, wherein a third set of the sets includes a compatible relation between the third input word and a third label, a fifth set of the sets includes a compatible relation between the fifth input word and a fifth label, the database further includes a first label sequence which is an orderly sequence consisting of the third label, the fourth label and the fifth label, wherein the fourth input word is not included in any compatible relations in the sets.

In one embodiment, in order to perform more precisely semantic analysis and machine translation and to supplement insufficient compatible relations stored in the database, wherein one of the sets further includes a word, one or more compatible words compatible to the word, and one or any combination of following set properties: a set property denoting the lexical category of the word; a set property denoting language of the word; and a set property denoting a level of ontology where the word belongs to.

In one embodiment, in order to perform more precisely semantic analysis and machine translation and to supplement insufficient compatible relations stored in the database, wherein a compatible relation of one of the sets further includes one or any combination of following compatible properties: a compatible property denoting an order of sequence of a word and its compatible word in the compatible relation; a compatible property denoting whether the word and the compatible word have to be immediately adjacent; a compatible property denoting a domain of the word and its compatible word; a compatible property denoting language of the compatible word; a compatible property denoting whether the compatible word is a label; a compatible property denoting a level of ontology where the compatible belongs to; and a compatible property denoting a lexical category of the compatible word.

In one embodiment, in order to perform more precisely semantic analysis by using semantic structure, the natural language processing method further comprising: finding out a subject verb data structure among the one or more subject word data structures; if the subject verb data structure is found, generating a tree structure of a semantic structure according to a frame of the subject verb data structure; and if the subject verb data structure is not found, generating a forest structure of the semantic structure which includes all of the one or more subject word data structures.

In one embodiment, the instant application can utilize words denoted in two different languages, wherein at least one of the input words is denoted in a first language and another one of the input words is denoted in a second language.

In one embodiment, in order to perform machine translation, the natural language processing method further comprising: translating each of the input words denoted in a first language in the semantic structure into input words denoted in a second language, respectively; and generating a sequence of the input words denoted in the second language in the semantic structure according to compatible relations of sets which include the input words denoted in the second language.

In one embodiment, in order to perform more precisely machine translation, wherein one of the sets includes a compatible relation of the input word denoted in the first language and the input word denoted in the second language, wherein the translating step is according to the compatible relation of the input word denoted in the first language and the input word denoted in the second language.

In one embodiment, in order to resolve ambiguous dependence parse trees according to intensities of compatible relations, wherein another one of the sets includes a compatible relation of the first input word and a third input word among the input words, the compatible relation of the first input word and the third input word includes a compatible property for denoting a second intensity representing occurrences of the first input word and the third word in the training corpus, wherein the natural language processing method further comprising: determining which one of the intensity and the second intensity is larger; wherein one of the one or more subject word data structure is consisted of the first and the second input words if the intensity is larger than the second intensity; and wherein one of the one or more subject word data structure is consisted of the first and the third input words if the second intensity is larger than the intensity.

In one embodiment, in order to satisfy a requirement that the semantic structure has to include all of the input words, the natural language processing method further comprising: forming another one of the subject word data structures which is consisted of the third input word if the intensity is larger than the second intensity.

In one embodiment, in order to meet voice input or syllable input, wherein the input words include syllables, the first input word is represented by the syllables.

In one embodiment, in order to take voice inputted command, the natural language processing method further comprising: determining whether a frame of verb is included in the semantic structure; finding out a control command corresponding to a verb of the frame if it is determined that the frame is included in the semantic structure; and executing the control command.

In one embodiment, in order to take more complicated voice inputted command, the natural language processing method further comprising: finding out one or more parameter of the control command in the semantic structure according to the frame before the executing step.

In one embodiment, in order to respond user in natural language, the natural language processing method further comprising: receiving a response message after the executing of the control command; forming a semantic structure of the response message; and generating a sequence of all of input words in the semantic structure of the response message.

According to one aspect of the present application, providing a computing apparatus for natural language processing, configured to execute instructions stored in a non-volatile memory for realizing the natural language processing methods.

BRIEF DESCRIPTION OF THE DRAWINGS

The advantages and spirit related to the present invention can be further understood via the following detailed description and drawings.

FIG. 2 shows a diagram of a semantic structure of the embodiment shown in FIG. 1.

DETAILED DESCRIPTION OF THE PREFERRED EMBODIMENT

Figure 1:
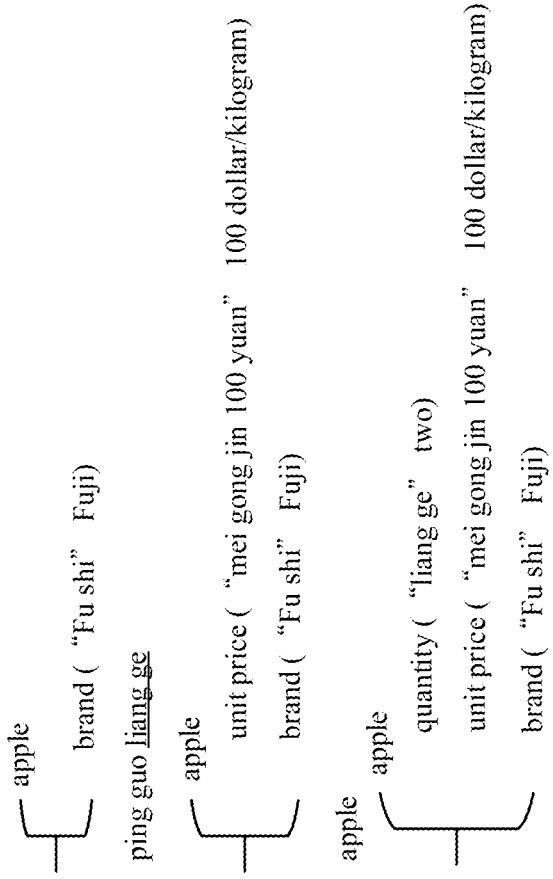
FIG. 1 shows a diagram of subject word data structures according to one embodiment of the present application.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

A modifier of a word X is often semantically compatible (or compatible in short) with X. A complex sentence can usually be composed from a simple sentence by adding compatible modifiers, sub clauses, and complements. Let FB(X) be the collection of compatible modifiers of X. Making use of FB and sentence structure, we can reversely deduce the original simple sentence from a complex sentence. To do this, we need to derive all pertinent compatible pairs from FB and sentence structure, which naturally gives us a dependency parse tree (DPT). The action of merging a modifier with X is called reduction. Sentence reduction is performed from the leaves of a DPT recursively to the root, its simplest form. In this invention, we describe how to use FB to produce a DPT, which can simultaneously help resolve word segmentation, and natural language generation.

Introduction to Reduction Processing

We found that human's cognition of words is quite diverse. A word is like a Facebook account which connects to many friends and many activities. A word usually comes along with "friendly words" in sentences. The interactions between words are like social networks of humans. Hence, a word represents a concept. The occurrence of a word represents some meanings. In addition to carry its own meanings, the word also influences the meanings of the entire sentence. This is also the course this instant invention intends to research. Although many examples elaborated are in Chinese, this instant invention can apply to any language.

Semantically Compatible Words in a Sentence

Relations of semantically compatible (or depending) words are very important in sentences. We may say that not a single word independently exists on its own in a sentence. It is to say that every word has a semantically compatible word other than itself in a sentence. Many of these semantically compatible relations are by convention. For example, we say "da le yi chang piao liang de qiu sai" rather than "da le yi chang mei li de qiu sai", even though meanings of pretty, "piao liang", and beautiful, "mei li", are similar. Lack of understanding such semantically compatible relations, computers usually perform erroneous parsing. Take the following sentences as examples:

1. "Wan cheng qing sao jia li de gong zuo" (Finish the job of house cleaning)

"Wan cheng" {["qing sao jia li"] "de" "gong zuo"}— ("Wan cheng"•"gong zuo")

Finish {[house cleaning] job}—(finish, job)

2. "Wan cheng qing sao jia lie de le se" (Finish cleaning the household garbage)

"Wan cheng" {"qing sao" ["jia li de" "le se"]}—("Wan cheng"•("qing sao"•"le se") event)

Finish {cleaning [house garbage]}—(finish, (cleaning, garbage) event)

Ordinary parsers usually process the second sentence in a very similar way to that of the first sentence, i.e., the main event consists of (finish, garbage). However, the correct interpretation is: finish the event of "cleaning garbage". It is to say, (finish, job) is a proper semantically compatible phrase, but (finish, garbage) is not.

There may exist tens of millions of such meaningful compatible relations that can be statistically extracted from very huge quantity of data. They cannot be generated according to any limited training material of machine learning. This also explains why the accuracy of ordinary machine learning models for natural language is limited.

Set of Compatible Words FB(X)

In this invention, it is assumed that such kind of meaningful compatible relations with frequencies are already gathered from a vast training corpus. In the following paragraphs, how to use them to comprehend natural languages more precisely would be discussed. In the following analyses, methods to gather such meaningful compatible relations will be briefly described.

For each word X, we define a set of compatible words of the word X as FB(X). FB(X) consists of X's property, event, and many other information in the ontology of X. (e.g. words in reference E-HowNet [1] or many other words via inheritance) and many other related words.

There are many compatible relations between words. A relatively common one is the modifier relation. For examples: noun and noun, adjective and noun, adverb and adjective, etc. Besides, activities that can take place at a location, like the word "restaurant" and its related concepts such as talk and dance. Moreover, regarding verbs, the compatible nouns can be subjects and objects of sentences; others include time or place adverbs or phrases.

Usually, a sentence comprises subject, verb and object. In the simplest sentences, there is no modifier. In order to make more complicate sentences, many compatible modifiers, clauses, or modifiers of modifier may be added on gradually.

In many circumstances, some compatible words are omitted in Chinese language, for example, "range of landmine" should be "range of landmine explosion" if said correctly. The "explosion" is an event of the word "landmine". And the word "range" is a property of the word "explosion". However, when searching for compatible words of the word "landmine", the word "range" would be considered as one if the phrase "range of landmine" appears very often.

Calculating Dependency Parse Tree of a Sentence Using FB Function

The present invention mainly describes the process of reducing a complicated sentence gradually to a simple sentence by using a prepared FB(X) knowledge base. During this process, a dependency parse tree of this sentence would be gathered.

When a modifier A is reduced to its adjacent collocated word X, we label the string AX as a concept of X, labeled as <X>. And, we generate an instance map to record this reduction step. If the neighboring word B is collocated with A (or X), we will further extend the concept <X> to include the entire string BAX. At the same time, the instance map of <X> will now include B under A (or X). By observing the structure of an NP, we can see that the concept of X can be extended to include a clause with modifiers, followed by "de". We can adopt many concept sequences similar to those used in biological NER during the process to form larger concept or structure. When validating the correctness of the structure of an NP, it is necessary to use long-distance quantifiers or verbs collocated with the head of this NP. For example, the pairs (complete, work) and (complete, house cleaning event) mentioned above.

When we combine different concepts, it is possible to find concepts that are partially overlapping but not inclusive of one another. Here, we utilized the frequency of the joint occurrence of modifier and collocated word, transformed into some kind of weights, to calculate the total weight of these overlapping concept as the criterion of selection.

When collocated FBs cannot help us find the best candidate, we need longer concept sequences for disambiguation. This is similar to what we have carried out in biomedical NER. Long concept sequence is even more important in voice input applications.

Structural Analysis of Noun Phrase

In the following, we discuss how to reduce a noun phrase NP (with a head noun N) to its head noun N. We use Chinese as an example. At first, NP (head N) has many plausible structures. Some modifiers require "de" in the end, but some do not. For example, when talking about the facilities in a restaurant, we say that the restaurant has a parking lot ("you ting-che-chang de canting"). When describing events that can happen in a restaurant, we say that the restaurant is suitable for chatting ("ke-yi liao-tien de canting"). The "parking lot" and the (suitable for chatting) are compatible words of the word "restaurant". For examples, in the phrases "little cat in yellow" ("huang se de xiao mao") and "little yellow cat" ("xia huang mao"), the word "de" is not required in the latter. When processing words in a sentence, it is impossible to enumerate these words in a dictionary, therefore, it has to be built on-the-fly in the process. For examples: numeric words "ninety-eight" and "123", time phrases "year, month, day" and "hour, minute, second", and determiner-measure (DM) construction ("ding-liang jie-go") in Chinese. More examples of DM include "a", "this", etc. We enumerate some common structures in the following paragraphs.
1. Modifier+N (no "de" in between)
2. Modifier+N (with "de" in between), this structure can be further classified into following cases:
   2.1. A+"de"+modifier+N
   2.2. N+"de"+modifier+N
   2.3. V+"de"+modifier+N
   2.4. VP+"de"+modifier+N
   2.5. S+"de"+modifier+N
   2.6. Time phrase+"de"+modifier+N (examination before Christmas "sheng-dan jie qian de kao-shi")
   2.7. Spatial phrase+"de"+modifier+N (house in the mountain "zai shan-shang de fang-zi")
3. Determiner-measure before or after the former two structures
   3.1. DM+modifier+N (noun quantifier) or modifier+N+DM
   3.2. DM+<u>modifier</u>+N (noun quantifier) or <u>modifier</u>+N+DM There are directly (adjacent) compatible words and indirectly compatible words among modifiers. Usually, at most one indirectly compatible word exists, whereas other modifiers would be placed in front of "de". By utilizing the frequencies of compatible words in the FB knowledge base, we can determine which one of three combinations (A, B), (B, C) and (A, C) of three adjacent words A, B, and C is most likely to be correct. And we can reduce the modifier inside an N. In the meantime, adjacent DMs can also be reduced into N. After that, an NP may be reduced into N or into a structure containing the modifiers and "de". A reduction result is shown in FIG. 1. It is worthy to note that time phrases and spatial phrases usually contain prepositions, therefore can be processed independently. Besides, a trigram is formed by the aforementioned words A, B, and C, which can be automatically generated according to bigrams denoted in our FB knowledge base. If further derived, compatible words of those modifiers can be extended, resulting in the generation of N-grams of the current language.

Furthermore, we can reduce modifiers of a verb V simultaneously. The modifiers usually consist of adverbs, time phrases and spatial phrases. Having the N and V reduced, the remaining clause usually only has the verb and its related arguments. (Note: due to natural constraints originated from language expression complexity, there is usually no clausal modifier in a clause. Hence, we do not need to consider recursive structures. For example, the time phrase in a clause modifying a verb does not contain another clause such as "that that you are right is wrong is right." This kind of sentences is usually hard to understand and only a few people would write in this manner. Therefore, complexity of analysis can be lowered vastly. Comparing with ordinary programming language, the number of loops in natural language is at most 2.) Using a Frame of the verb V, we can chunk semantic segments of a clause. If there is a clause in the time phrase or the spatial phrase, it can be processed in a similar way. After the clause is processed, we can reduce complicated NPs inside an aforementioned structure of N and reduce modifiers of V inside a V.

In the meantime, with regard to some duplicated or enumerated "parallel structures", they can be combined at first. For example, "orange, pear and apple" can be reduced to "orange". Under the "orange", a list would be recorded to include pear and apple. "Naughty and lovable" can be reduced to "lovable".

Instance Map Represents Semantic Roles in a Sentence

When NP and V are all reduced to head words, only a frame of verb and its arguments remains. We may determine whether the arguments and their verb are reasonable compatible words by consulting the FB knowledge base. Subsequently, placing head words of NP and V into appropriate positions according to a role name of the verb frame. Further, placing modifiers under heads according to their semantic information, an incidence map of this sentence is formed accordingly. (Note, an instance map of a clause can be recursively formed). Take the following sentence as an example, "Xiao-ming will give Xiao-hwua two Fuji apples, each costs 100 dollar per kilogram, tomorrow" ("Xiao-ming da suan ming tian gei Xiao-hwua mei gong jin 100 yuan de ping guo liang ge"), the reduction result is as shown in FIG. 2.

Besides, there may be complements in a sentence. A complement itself maybe one sentence or adjective phrase. We can use the same reduction method on it.

After a word A is reduced inside its dependent word B, we may appropriately adjust the label of the word B in order to reflect semantics of their combined words more precisely.

The idea of reduction can be similarly applied to other languages. In the following, we apply reduction to English. Consider the sentence:

I saw a man swimming in the river on the bridge.

The basic SVO (subject verb object) structure is (I, saw, man). "Swimming" is modifying "man"; "in the river" is modifying "swimming"; and "on the bridge" is modifying "saw." For prepositional phrases used as a modifier, we can simplify it as (in, river), (on, bridge), and consider them as FB of the words they modified.

In another case, consider the sentence:

The archaeologist is in trouble.

With the pattern: <people>: <be>: <in a situation>, one can make it more complicated by adding modifiers one-by-one:

The old archaeologist named John is in a serious trouble.

The old archaeologist named John Doe is in a very serious trouble with his academia reputation.

Conversely, one can revert it back by modifier reduction given their respective FBs.

Broad Description of the Collection Method of FB Knowledge Base

Recall the aforementioned structures of NP (head N) and how we may use existing Chinese parsers to parse a large quantity of sentences in order to analyze NPs in these samples. This is for the purpose of finding out the compatible words of a head N, which include those in front of and after the word "de". Although outcomes of the parser may not be always correct, it still has a great chance to gather pairs of truly compatible words (N, N') if the quantity of pairs in these training sentences is large enough. Some of the adjacent words may be a compatible word of another compatible word. For an example like "physician of Taoyuan hospital" ("Tao-yuan yi-yuan yi shi"), the word "hospital" ("yi-yuan") is a compatible word of the word "physician" ("yi shi"). And the word "Taoyuan" is a compatible word of the word "hospital" ("yi-yuan"). Similarly, for another example, "attending physician of Taoyuan hospital ("Tao-yuan yi-yuan zhu-zhi yi shi")," the aforementioned relations remain. Additionally, the word, "attending", ("zhu-zhi" is a compatible word of the word "physician" ("yi shi"). Statistics of other compatible pairs such as (V, N) and (N, V) can be done by using parse trees in very similar ways.

Abstraction of FB(X) Semantics

In natural languages, there are many hierarchical semantic classification trees (e.g., E-HowNet [1]). Words are classified into different categories according to their semantic similarity. For example, "apple" may be classified in the category "fruit" and "fruit" is in turn classified in the category "food". The names of these categories are called semantic labels. When considering FB(X), the word X itself may be a semantic label, too. Analogously, the compatible words in FB(X) may be semantic labels. In many situations, due to the lack of training data, compatible words FB(X) of some word X are not collected sufficiently. In this case, we may observe whether there exist many words classified in higher categories of this word X are already compatible with another word Y. If so, we may consider (X, Y) as a weak compatible pair. For example, it is quite often to find phrases like "eat apple" and "eat banana". It means that the word "eat" is a compatible word to the words "apple" and "banana". If the number of occurrence of the phrase "eat durian" is low, the system may take the word "eat" as a weak compatible word of the word "durian".

Named Entity Recognition (NER) by Using Fb Knowledge Base

In the aforementioned reduction of ordinary sentences, the outcome of reduction is a frame of verbs with arguments. In recognition of named entities, we adopt another method. After proper annotations, reduction can be achieved by using annotated FB knowledge base. Many named entities may be concluded into label sequences in a dictionary. Examples presented here are gene names in biomedical science. From the perspective of reduction, rules of naming human gene are summarized. In view of semantic meanings of human gene naming, it can be seen that the gene themselves are described from different perspectives. Roughly, they may be classified into appearance/structure, function-related description, origin/source/homolog, and family term of a gene. These classifications are extended from principles [2] defined by HUGO Gene Nomenclature Committee (HGNC). The following paragraphs try to induct human gene naming rules in perspective of reduction and to give examples of corresponding categories of gene naming. FIGS. 3 through 14F show label sequences of gene reductions in accordance with embodiments.

1. Appearance/Structure of Gene—Appearance

This class of naming emphasizes descriptions of genome structure. Semantically, it usually contains [Structure], [Sequence], etc. Take the following four gene names as examples, similarities in their naming can be found.

| Gene name | Concept tag |
| --- | --- |
| zinc finger protein 36 (ZFP36) | [Chemical] [Structure] [Head_Mol][Specifier] |
| endothelial PAS domain protein 1 (EPAS1) | [Organ_Tissue] [Structure] [Head_Mol] [Specifier] |
| G protein-coupled receptor 87 (GPR87) | [Structure] [Function_Mol] [Specifier] |
| proline rich transmembrane protein 2 (PRRT2) | [Sequence] [Structure] [Head_Mol] [Specifier] |

※ Molecule post-fixed to gene name are classified as [Head_Mol] or [Function_Mol] to distinguish whether they contain functional descriptions.
The former is used like neutral words like protein, homolog and molecule.
The latter is used to identify factor, receptor, enzyme, function oriented words, etc.
This kind of tags is used to distinguish receptor molecule in gene itself.
Take "protein serine-threonine phosphatase 2A" as an example, the protein is the receptor.

The gene labels [Chemical], [Organ_Tissue] and [Sequence] mentioned above can be further reduced into the label [Structure]. Finally, a label sequence of gene concepts is reduced to "[Structure] [Head_Mol] [Specifier]".

2. Functions of Gene or Functional Related Description—Functional Related Description This class of naming covers various and wide ranges of examples. A gene name may contain functions caused by the molecule, functional area or influences of mutations. If no specific function of the gene but interactions or connections to another gene is found, the gene name may contain the name of other genes. The following show examples:

The function of Vascular epidermal growth factor A (VEGFA) is to promote vascular epidermal growth. Its concept tags can be:

| Vascular | epidermal | growth | factor | A |
|---|---|---|---|---|
| [Organ_Tissue] | [Organ_Tissue] | [Target_Function] | [Function_Mol] | [Specifier] |

Figure 3:
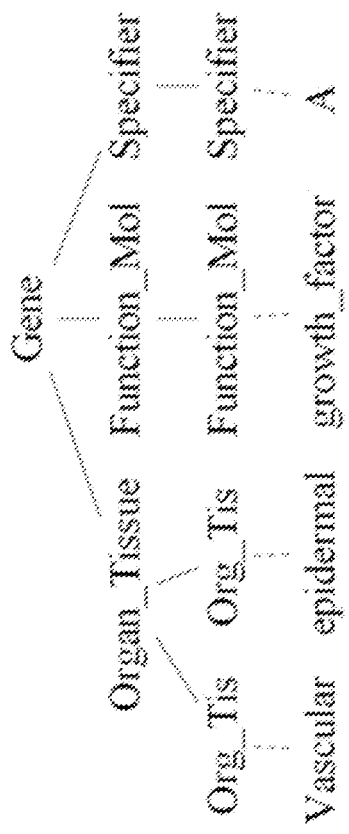
FIGS. 3 to 14F illustrate diagrams of label sequences of human gene names according to embodiments of the present application.

In this label sequence, adjacent occurrences of [Organ_Tissue] can be combined. In the end, three concept tags are used to represent VEGFA, namely, [Organ_Tissue] [Function_Mol] [Specifier]. The result is shown in FIG. 3.

Protein serine-threonine phosphatase 2A (PP2A) is a member of a phosphatase family. Its main function is to cut phosphate on serine or threonine of target protein, thus deactivating the target protein. The concept tags include:

| protein | serine | threonine | phosphatase | 2A |
|---|---|---|---|---|
| [Head_Mol] | [Chemical] | [Chemical] | [Function_Mol] | [Specifier] |

Figure 4:
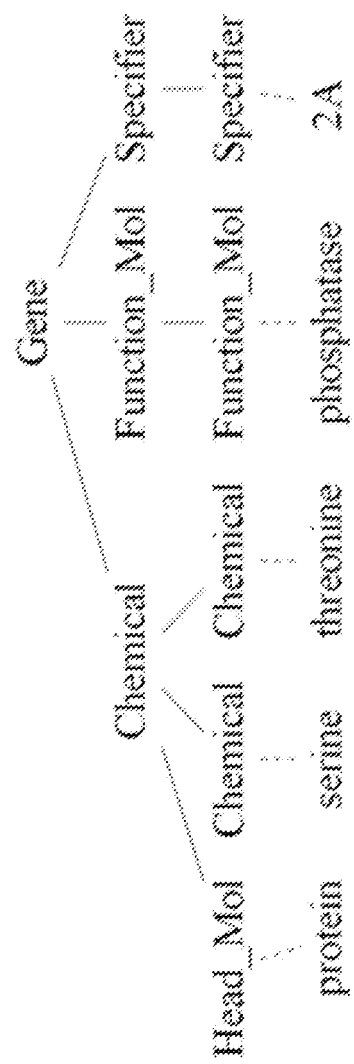
Figure 5:
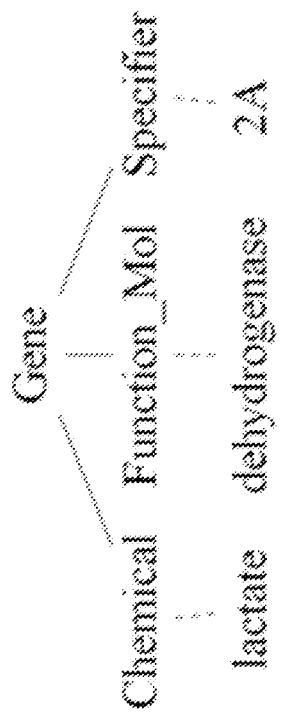
Figure 6:
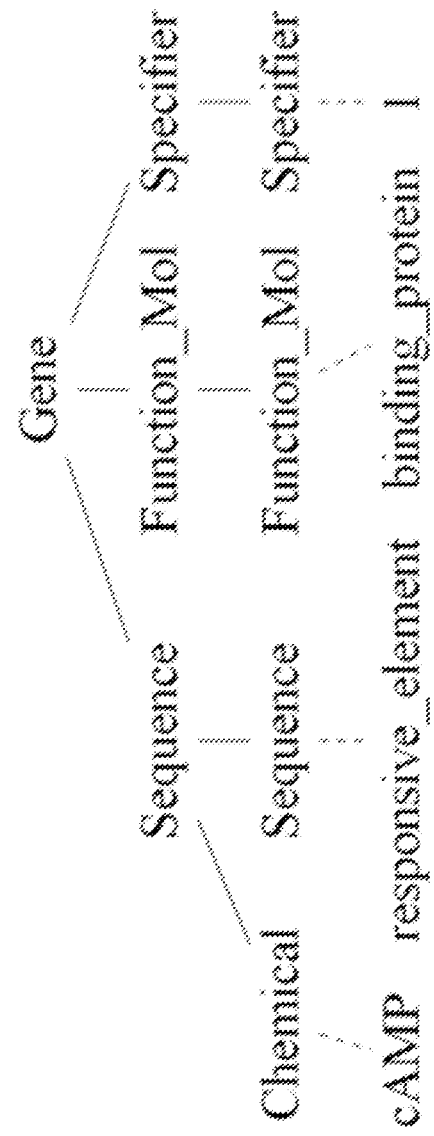

The tags [Head_Mol] [Chemical] [Chemical] are the working targets of the gene. They can be combined as [Chemical] semantically, too. And "phosphatase" acts as a [Function_Mol] of this gene. Finally, the integrated semantic concept of PP2A is as shown in FIG. 4.

Lactate dehydrogenase A (LDHA) is a member of lactate dehydrogenase. This gene name is simple and short. However, at a higher level of semantics, this name is coincidently similar to PP2A. They are both a combination of target compound and functional molecule. The result can be seen in FIG. 5 which shows similarities between LDHA and PP2A as shown in FIG. 4.

In additional to plain semantic concepts, functional gene names may comprise a recursive semantic structure. Just like the functions described by the two gene names below, which acts on another fully-defined sequence or gene. Their roles are analogous to a clause of a sentence in English or to a phrase in Chinese.

After decomposing the name "cAMP responsive element binding protein 1" (CREB1), we can observe that a specific element that is responsive to the concentration level of cAMP. And the function of CREB1 protein is to combine with the specified responsive element. The structure of this gene name can be decomposed as concepts shown in FIG. 6. The "binding protein" is marked as [Function_Mol] and to be combined with another complete concept, the cAMP responsive element.

Figure 7:
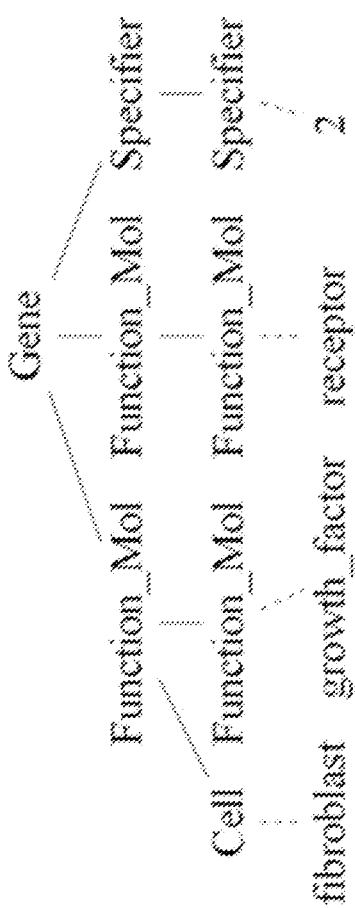

Name structure of the fibroblast growth factor receptor 2 (FGFR2) is similar to CREB1. The differences are their respective receptors. Fibroblast growth factor is a series of functional proteins. FGFR2 interacts with it as a receptor. A label sequence representing its gene concepts is shown in FIG. 7.

Other than the aforementioned gene names, the target of some genes are unknown. However, through observations or experiments, specific diseases are induced when these genes malfunction (deactivated or mutated). The results are used to name these genes.

Figure 8A:
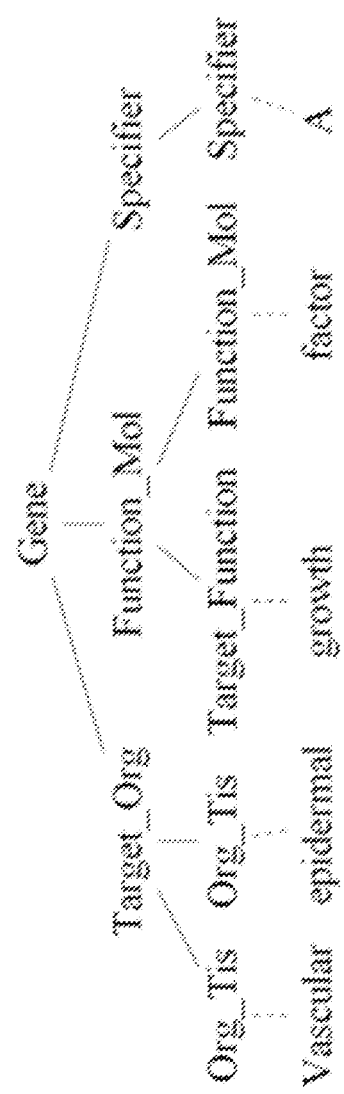
Figure 8B:
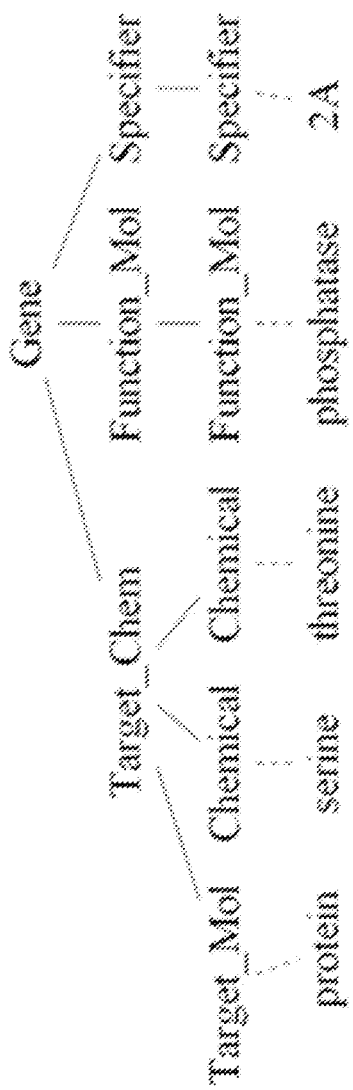
Figure 8C:
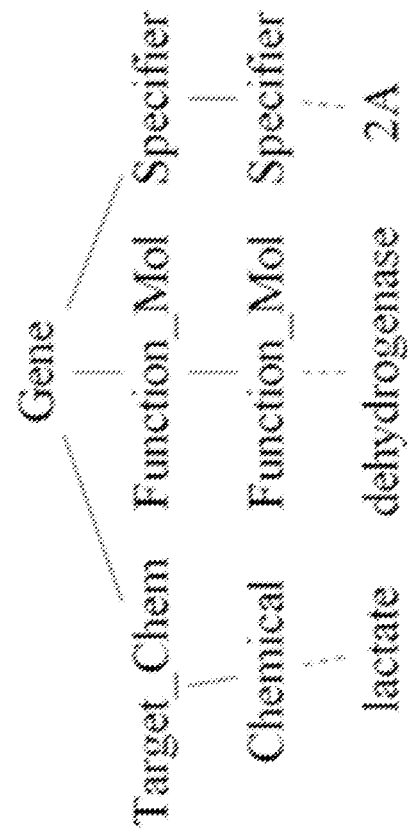
Figure 8D:
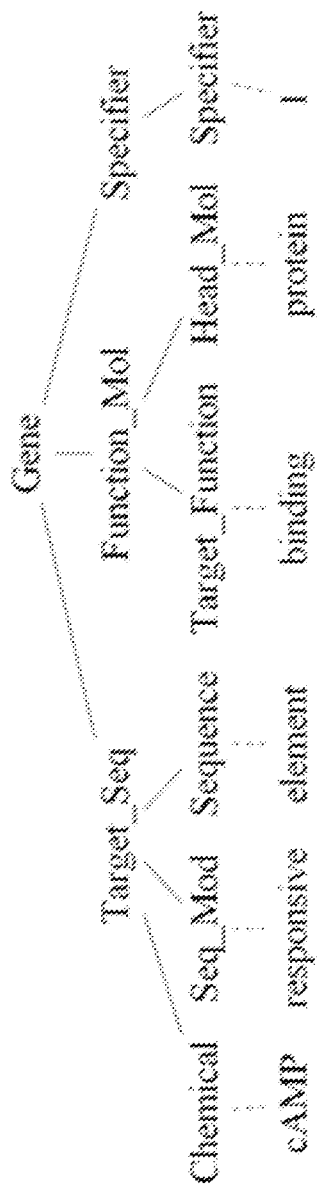
Figure 8E:
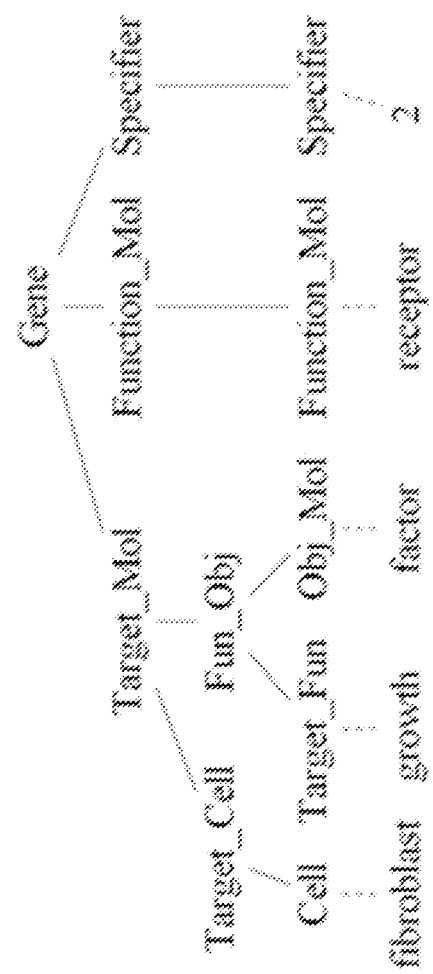
Figure 8F:
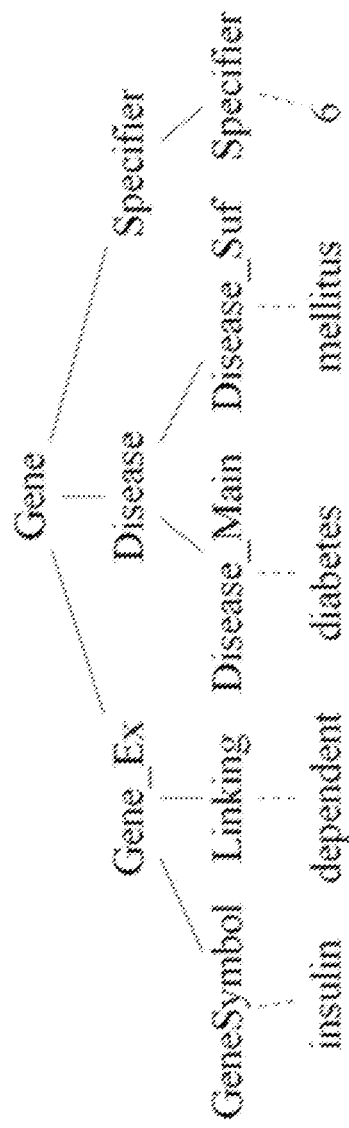

Insulin-dependent diabetes mellitus 6 (IDDM6) is a gene corresponding to insulin dependent diabetes. And this name does not end with descriptions of specified molecules such as protein or receptor. The trailing serial number represents that it is a complete gene. Gene concepts contained in this gene name are mapped to biology-related semantics as shown in FIG. 8F.

Figure 9:
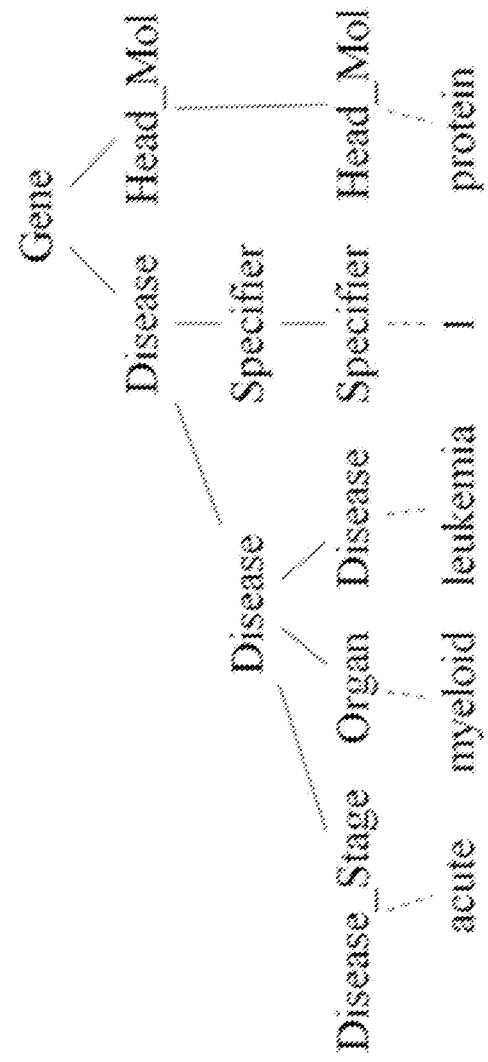
Figure 10:
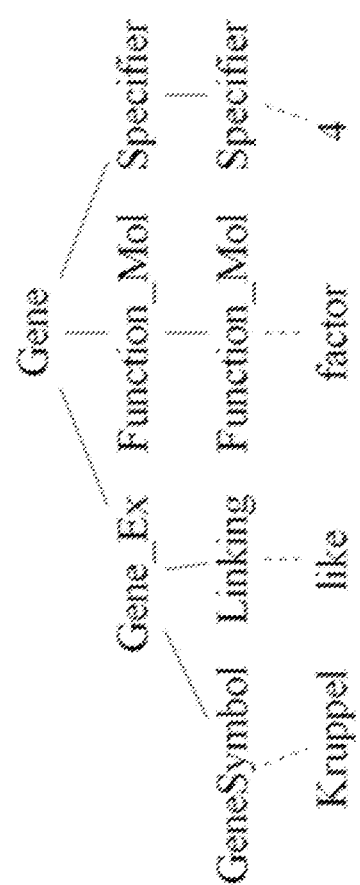

It is found that acute myeloid leukemia 1 protein (AML1) is a pathogenic gene which leads to acute myeloid leukemia. Therefore, it was named directly after this disease. However, in writing, it is often confusing for readers whether the described subject is the disease or the corresponding protein if the context is not clear. Semantic concepts as shown in FIG. 9 can clearly described the naming structure of the AML1 protein.

3. Origin/Source/Homolog of Gene

This class of human genes is found according to discoveries of other species' genes. Their names usually carry names of other genes and being supplemented with words such as 'homolog' or 'like,' in order to express their origins.

Figure 11:
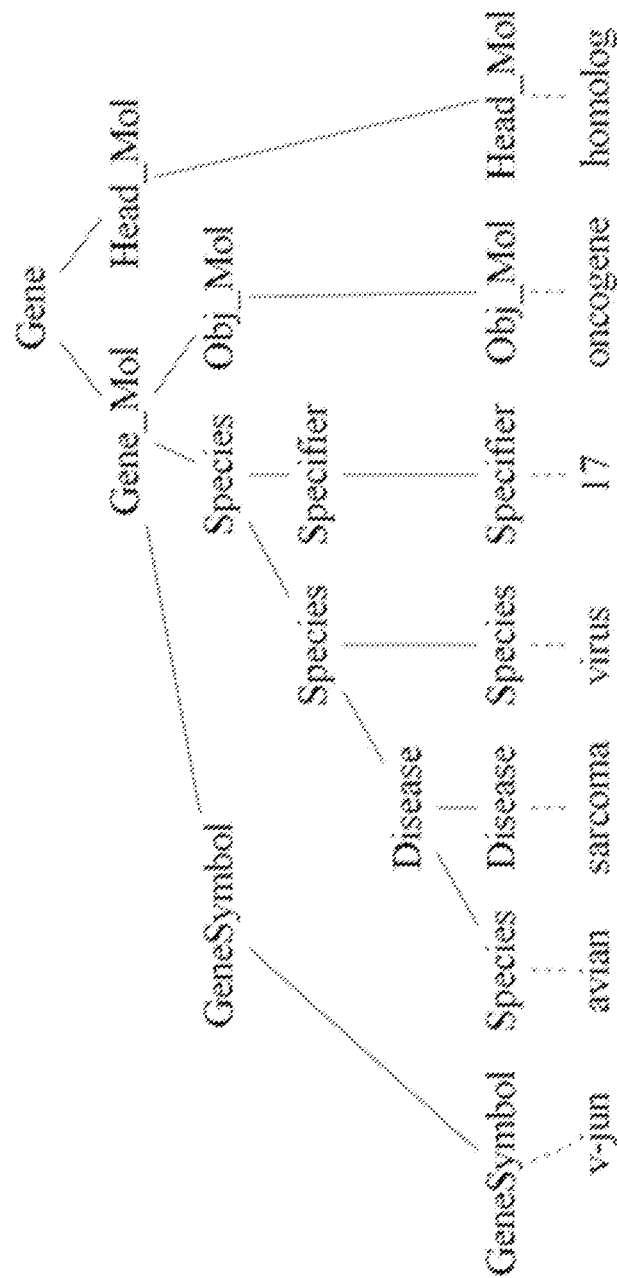

"Krupple" of "Kruppel like factor 4" (KLF4) is a gene found in *drosophila* first. Mutations of this gene cause incompleteness of *drosophila* larvae. This gene is incorporated into the name of KLF4 in order to describe that the functionalities of KLF4 gene is similar with "Kruppel". And its gene concept is also extended from "Kruppel," which forms the structure shown in FIG. 10.

v-jun avian sarcoma virus 17 oncogene homolog (JUN), when viewed from its naming, we can tell that human's JUN gene and avian sarcoma virus' v-jun are close homolog genes. Complete gene semantic structure is as shown in FIG. 11. It can be found that the semantics covered by the JUN gene can be reduced into two upper layer concepts after integration.

4. Family Name of Gene—Family Term

This kind of genes has its own family/superfamily pedigrees. Usually each family has its own naming logic. However, since the origin may be rooted at some complex or common characteristics (all of them are small molecules or cell surface proteins), etc., genes in the same family have identical prefix name. The post-fixed numbers or sequence of alphabets may be tens or even hundreds in length.

Figure 12:
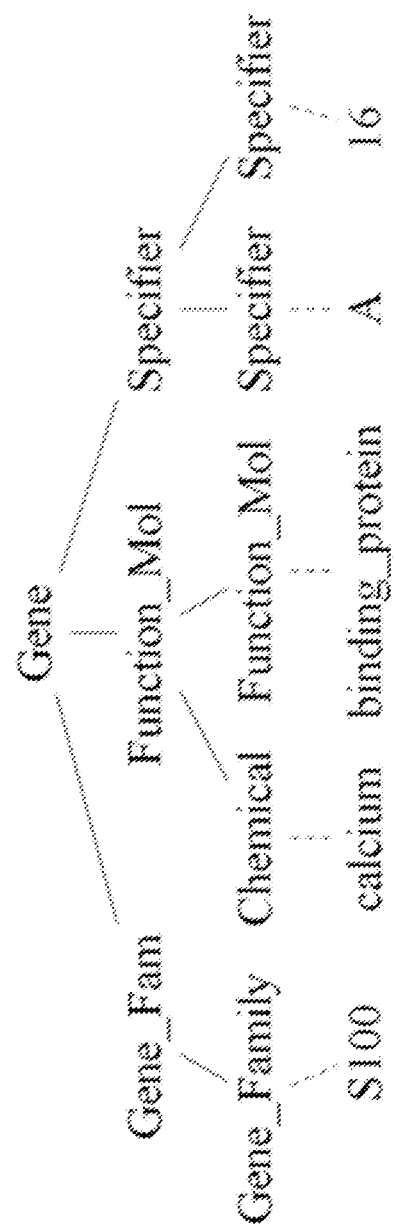
Figure 13:
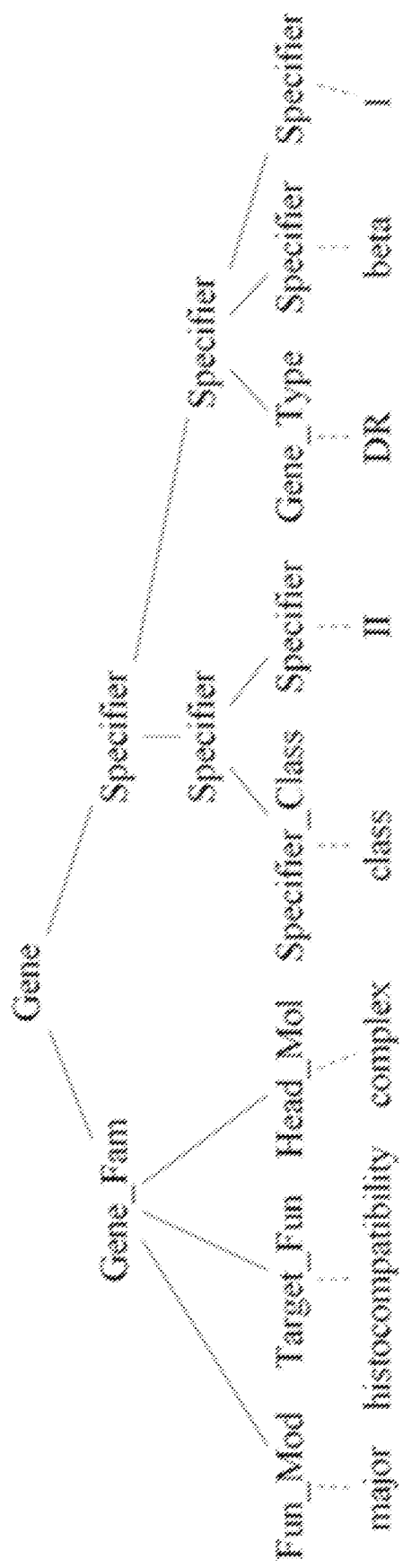
Figure 14A:
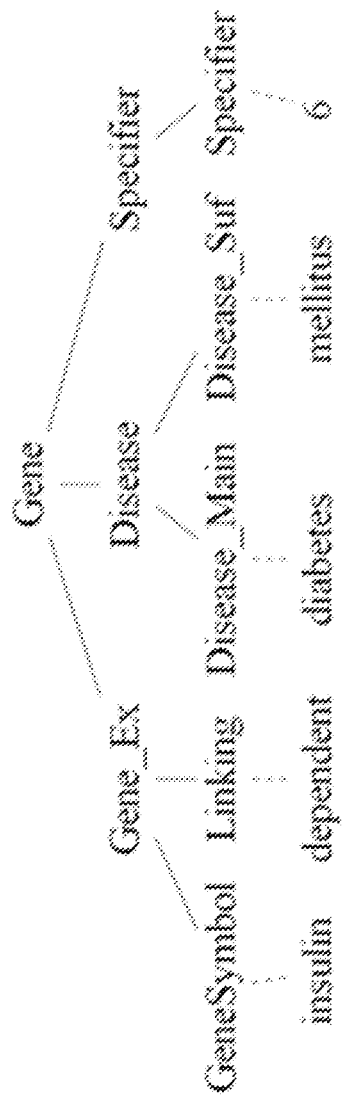
Figure 14B:
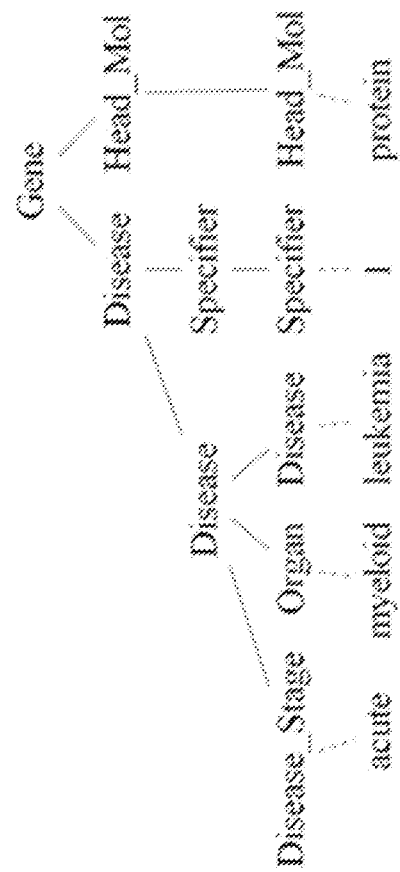
Figure 14C:
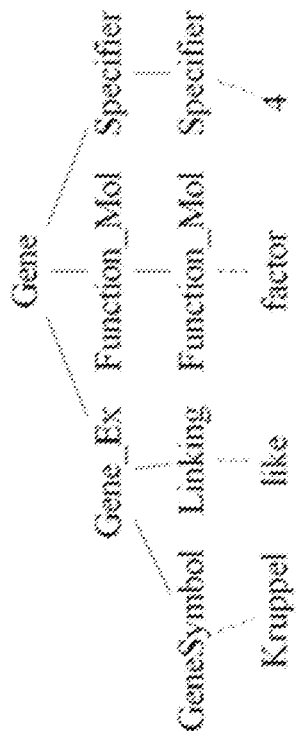
Figure 14D:
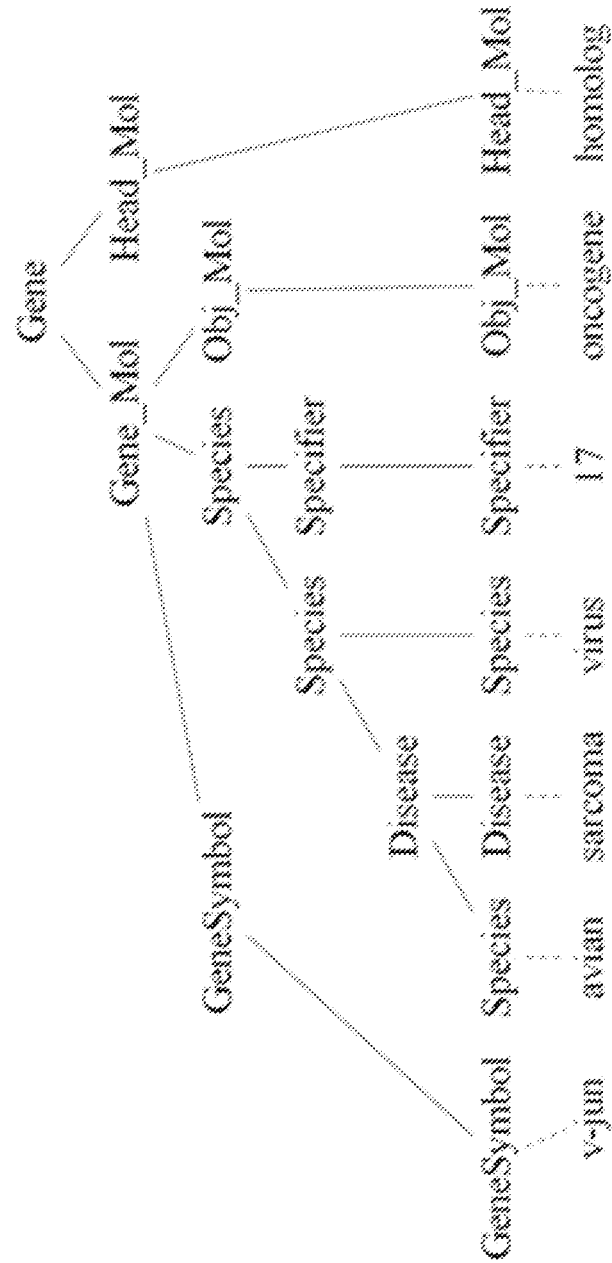
Figure 14E:
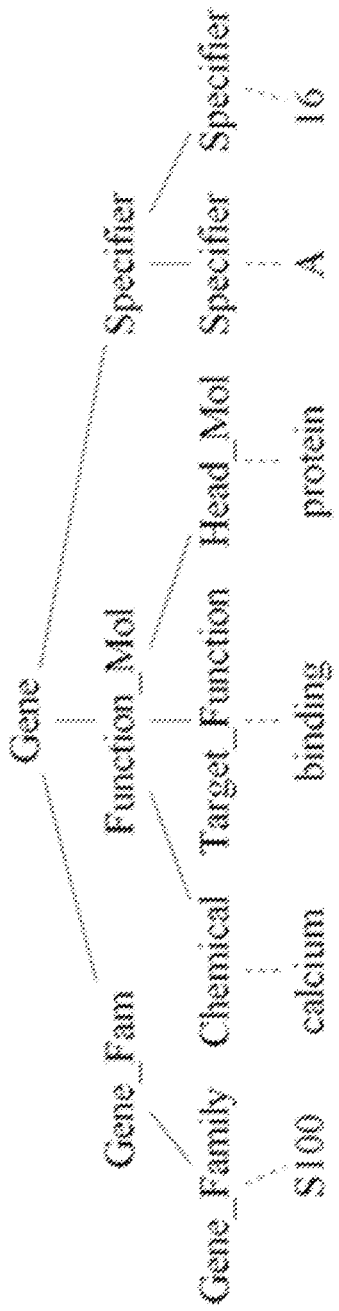
Figure 14F:
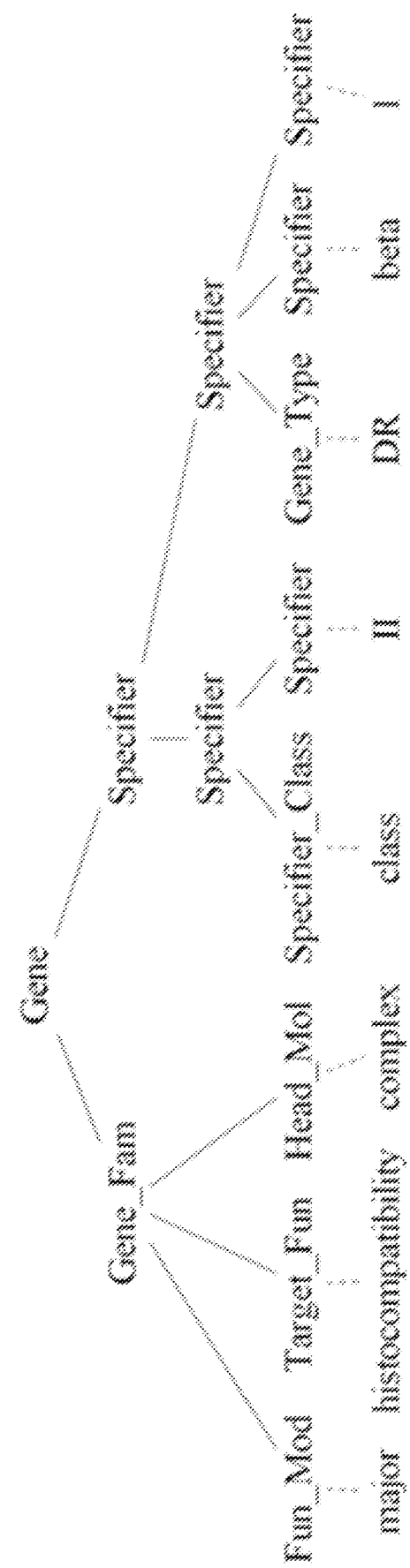

S100 calcium binding protein A16 (S100A16) is a member of the low molecular weight protein S100 family. This series of proteins have capabilities to combine with calcium ions. Different serial numbers are given in their full names to distinguish them. As shown in FIG. 12, characteristics of this gene family are placed in front of the label sequence. [Specifier] in the end is used to specify actual sequence of the gene.

Major histocompatibility complex, class II, DR beta 1 (HLA-DRB1) is an antigen recognition protein on cell surface. MHC is a big gene family highly related to immune function. Human's MHC gene is also known as human leukocyte antigen (HLA). In order to recognize various substances in the environments, this series of gene is characterized by having many gene types and sub categories.

Note 1: If a gene is named after multiple functions/reasons, a word "and" is used in the name to connect them. In cases where the agent, position, or subject are emphasized, prepositions (of, for, on) are usually included in the gene name.

Note 2: A gene may have different aliases which are used to describe this gene from different perspectives.

Note 3: The aforementioned categories for describing human gene naming may not be complete. Further work is needed to complete them.

When named entities (NE) are composed of known words, we have seen how to generate the corresponding concept sequence from the examples in biomedical NER. However, there are two exceptions that need to be considered:

1. When there are unknown words in an NE, we need to use it together with neighboring known concepts to construct a longer and more stable concept sequence. For example, a two-character name like "Qian Liu." We may need more context, such as the concept sequence of "The magician Qian Liu's performance" would be "[occupation] [person] [verb]," in which "[occupation]" is in the FB of the left side of an NE, and "[verb]" is a collocated FB word for person name on the right.

2. When the length of the concept sequence is too short (e.g. containing only one or two words), it is prone to ambiguity and could lead to recognition errors. Here, similar to the situation in (1.), we will also consider using the external FB of the NE to assist the construction of a longer and more stable concept sequence.

Retrieval of Component Relation

Figure 15:
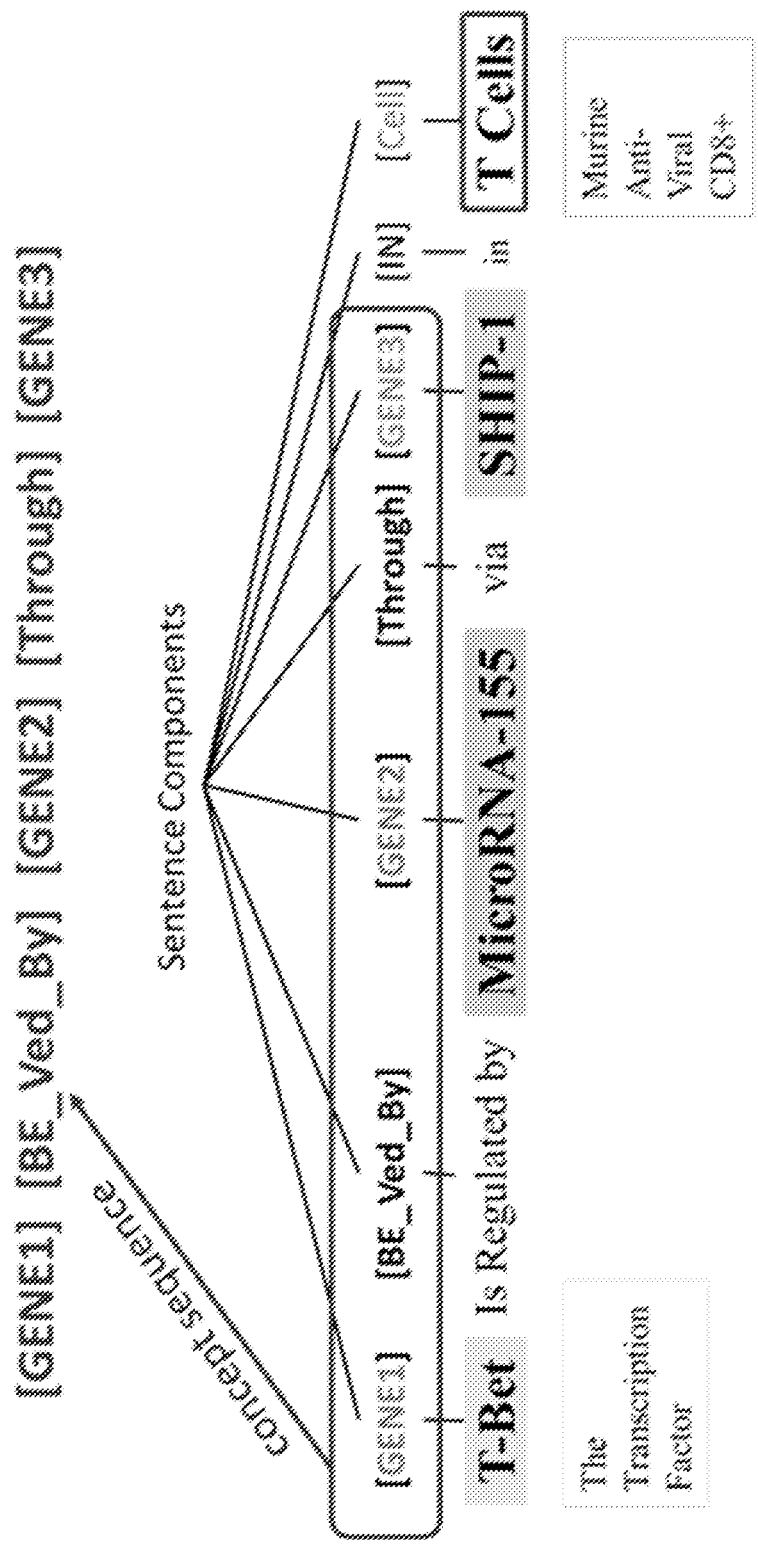
FIG. 15 depicts a concept sequence or a label sequence of a sentence in accordance with an embodiment of the present invention.

Please refer to FIG. 15, which shows a concept sequence including named entities of a sentence according to an embodiment of the present application. Please consider to the following sentence: The Transcription Factor T-Bet is Regulated by MicroRNA-155 in Murine Anti-Viral CD8+ T Celles via SHIP-1. There are three genes in this sentence: T-Bet, MicroRNA-155, and SHIP-1. Using reduction, we can shorten the sentence to "T-Bet is regulated by MicroRNA-155 in T Cells via SHIP-1". By replacing words with semantic labels, we obtain the label sequence: [Gene1] [BE_Ved_By] [Gene2] {Through} [Gene3] [IN] {Cell}. And the part relevant to gene relations is [Gene1] [BE_Ved_By] [Gene2] {Through} [Gene3], which is the learned concept sequence as shown in FIG. 15. Any sentence matches this concept sequence will be assigned the following relations: 1 positive pairs: (Gene1, Gene2), (Gene2, Gene3); 2. negative pair: (Gene1, Gene3).

Utilizing FB to Perform Word Segmentation and Voice Recognition

Correct segmentations also satisfy compatible relations between word and word specified in FB. Since the aforementioned dependency parse tree algorithm is based on compatible words, the chosen compatible word should have correct boundaries. If syllables are received by our method, corresponding words can be generated at first and the dependence parse tree algorithm is applied similarly.

If the input is a sequence of characters, zhuyin, pinyin, or speech signal, we will apply the aforementioned algorithm to construct a dependency parse tree. When characters are the input, after the algorithm is completed, the parse tree would naturally provide the segmentation at the same time. In the cases of phonetic input, we will not only get the segmentation result, but also the corresponding character sequence. FB remains a strong tool to disambiguate homophones when the input is pinyin, or voice. The difference is that we need more precise calculation of the link strength of the collocated words, because the number of possible ambiguities will be greatly increased due to the large number of homophones. However, by filtering with FB and structure (grammar) patterns, the correct dependency tree can be effectively generated.

Moreover, our system can recognize "unknown words" at the same time in voice input. We need to use internal or external FB of NEs, or longer concept sequences, to confirm the boundary and category of the unknown words and their internal combination.

Utilizing Fb to Generate Natural Language

At first, we collect arguments and frames of verbs in Chinese. Secondly, for each verb, many instances of sentences using this verb are collected. Meanwhile, for each noun, many instances of phrases containing this noun and its modifiers are also collected. Then their corresponding incidence maps are generated. When we want to generate a new natural language sentence, we follow these steps:

1. (S2501) Identify main arguments such as S, V, O and modifiers of each word.

2. (S2502) Fill the aforementioned information into an instance map according to the frame of this verb.

3. (S2503) Choose proper positions of arguments according to the collected frames and instances of sentences corresponding to the V.

4. (S2504) In the next step, fill modifiers of each argument in the sentence. Due to language characteristics, we may assume that this part can be done independently for each argument. It is to say, for each argument, we can learn how to fill the modifiers in the surrounds of this argument from the collected phrases describing the argument, the incidence map and structure of the aforementioned noun phrases. For example, the phrase "a lovable small multi-colored kitten" ("yi zhi ke-ai de xiao hua mao"), tells us that for animals, the word small ("xiao") for describing its size should be placed in front of the color, ("multi-colored"). However, if more than one word is used to describe its color, the color modifier should be placed in front of the size. For example, a dark-gray small kitten, ("yi zhi shen-hui-se de xiao mao").

Machine Translation Using FB

The present invention can apply to any language and so does the collection process of FB(X). Having this data, a sentence in any languages can be parsed to obtain its dependency structure. Consequently, a corresponding incidence map can be generated. In the following, we take an example to explain how to translate by using this kind of incidence map and FB. Consider sentences (1), (2) and (3) in Chinese below. All of these sentences have identical meanings. However, the subjects on which they emphasize are not the same. The following is their corresponding incidence map. According to the incidence map in Chinese, we can translate Chinese into English. In order to maintain coherence, the translations need to use compatible words in English. Therefore, the corresponding English compatible words of "chu-li" and "ji-hua" are "handle" and "project". Having the incidence map in English, we can use the aforementioned natural language generation to generate a sentence in English. Reversely, when translate an English sentence into a Chinese sentence, it can use the same way to perform dependence parse, to generate an incidence map in Chinese according to compatible Chinese words of the English words of the incidence map, and to generate a Chinese sentence.

1. "zhe ge ji hua ni chu li de hen bu cho"
2. "ni zhe ge ji hua chu li de hen bu cho"
3. "chu li zhe ge ji hua ni hen bu cho"
"Ni" (you)
   event: "chu li" (handle)
   target: "ji hua" (project)
   result: "hen bu cho" (very good)
4. You handled this project well.
5. You are very good in handling this project.

It is emphasized that when utilizing FB to generate natural language, there are two ways of input.

1. The user inputs a sentence, for example, a sentence translated by Google, hoping to get a more fluent sentence with a similar meaning. We first use FB to generate the dependency parse tree. During the process, the user may have used un-popular collocated words, the calculation of the dependency parse tree may require more generic semantic class instead of the original FB words. At the same time, the relevant SVO and collocated modifiers need to be selected, and their order properly arranged. Since we have many well-written sentences with their instance maps already constructed, theses can serve as a training set for the reverse operation from instance maps to sentences.

The user specifies person, event, time, place, object, and corresponding modifiers, and we need to generate natural language sentences from these words. In this case, we already have an instance map, so we only need to find relevant SVO and collocated modifiers (replace or remove the inappropriate ones). The remaining steps are similar to (1).

REFERENCES

[1] "Guang yi zhi wang", http://www.aciclp.org.tw/use_ck-ip_c.php
[2] H. M. Wain, E. A. Bruford, R. C. Lovering, M. J. Lush, M. W. Wright, and S. Povey, "Guidelines for human gene nomenclature," *Genomics*, vol. 79, no. 4, pp. 464-70, April 2002.

Figure 16:
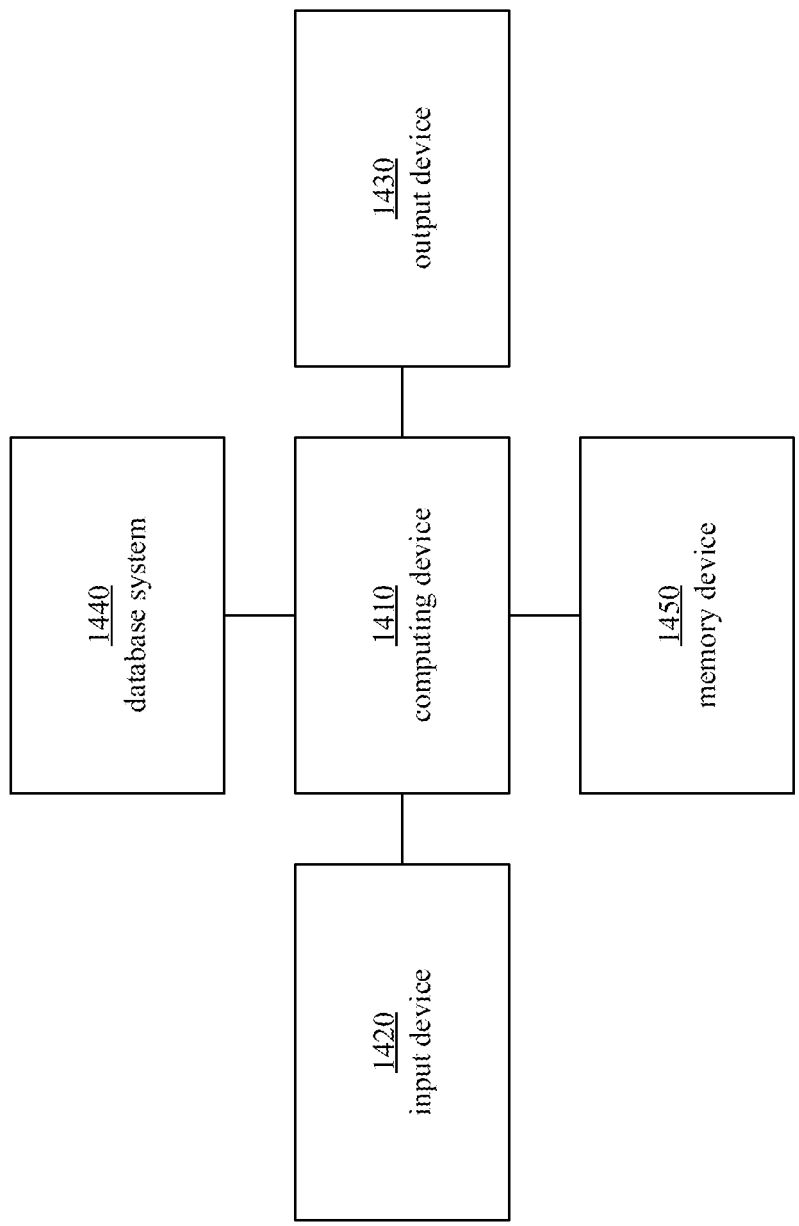
FIG. 16 depicts a block diagram of an electronic system 1400 in accordance with an embodiment of the present invention.

Please refer to FIG. 16, which is a block diagram that shows an electronic system 1400 according to an embodiment of the present invention. The electronic system 1400 comprises a computing device 1410, an input device 1420, an output device 1430, a memory device 1450 and a database system 1440. In one embodiment, the electronic system 1400 is a single computer system. The computing device 1410 is configured for accessing software stored in the memory device 1450 in order to execute an operating system and application programs for controlling the input device 1420, the output device 1430, the memory device 1450 and the database system 1440. In one embodiment, the database system 1440 and the computing device 1440 are located in different computer systems interconnected via wired or wireless network. For example, the database system can be any computer system providing any relational or non-relational database management system (DBMS), such as Microsoft SQL Server, Oracle's Oracle and MySQL and etc. DBMS. The computing device 1410 may execute the DBMS as the database system 1440 for inquired by other programs.

The input device 1420 may include keyboard, mouse, optical disc, network, microphone and/or any other external device. User may input data or network into the computing device 1410 via the input device 1420. The output device 1430 may include screen, network, speaker and/or other external device. The computing results can be outputted via the output device 1430.

In one embodiment, the computing results of the computing device 1410 can be organized according to specified data structures and stored into the memory device 1450 and the database system 1440, too.

Figure 17:
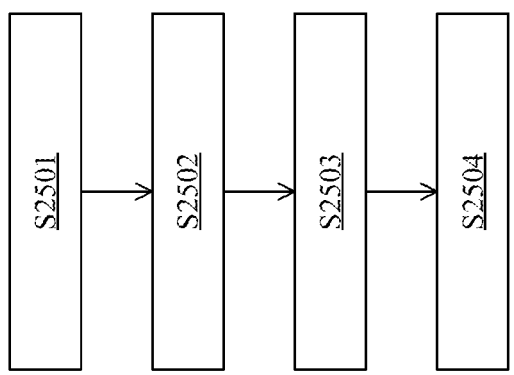
FIG. 17 depicts a flowchart diagram of a natural language generation method in accordance with an embodiment of the present invention.

Please refer to FIG. 17, which is a natural language generation method according to one embodiment of the present invention. The generation method is described in the corresponding inventive points.

Figure 18:
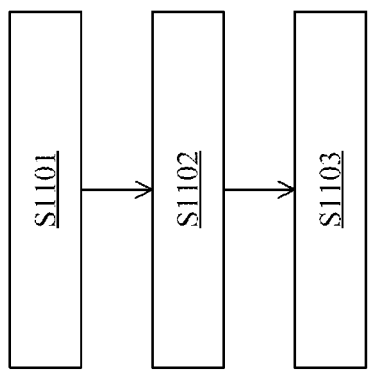
FIG. 18 depicts a flowchart diagram of a reduction method of subject words in accordance with an embodiment of the present invention.

Please refer to FIG. 18, which is a reduction method of subject words according to one embodiment of the present invention. The reduction method is described in the corresponding inventive points.

Figure 19:
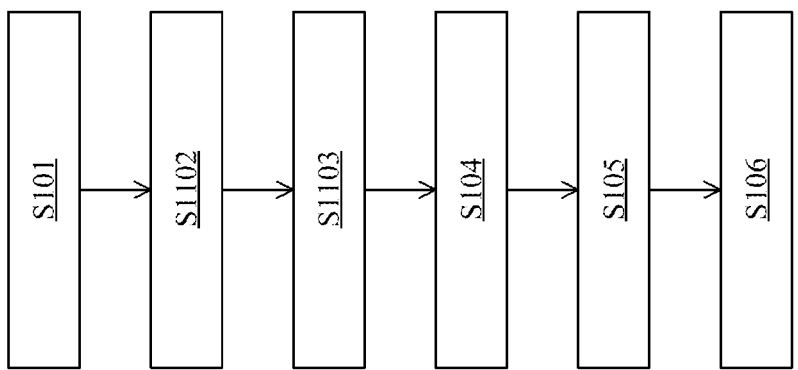
FIG. 19 depicts a flowchart diagram of a semantic analysis method of sentences in accordance with an embodiment of the present invention.

Please refer to FIG. 19, which is a sentence analysis method of according to one embodiment of the present invention. The reduction method is described in the corresponding inventive points.

Following rules defined in examination guidance of computer software invention, the present invention provides functional effects in technical fields. The present invention can be applied to semantic analysis of natural language. The resulted incidence map after semantic analysis can be feed into artificial intelligence system or other programs. At last, natural language is generated as a response. Take an example, an inquiry to related database can be made according to a result of semantic analysis of natural language and an output in natural language of the database inquiry is generated. For example, a semantic meaning of user's input is analyzed that start an air conditioner of a living room and set the temperature to 26 degree. Then through a controller of intelligent family, the air conditioner of the living room is powered on and the temperature is set to 26 degree. At least, a synthesized voice outputted in natural language responds to the user to report that the air conditioner was already started and the temperature was set to 26 degree.

The present invention can be applied to customer service systems, indecent language examination mechanisms of social network software, voice command interfaces of various machines, machine translations and etc. Technically, computing time can be saved. Users' input may be responded in time or in real time. In addition, it is convenient for user to input by voices and for voice outputs. This makes user can control machines without learning special control interfaces. Since the present invention uses machine to recognize natural language which is done by human minds' activities, the present invention replaces human minds by special algorithm. Hence the algorithm makes the whole invention is technical. In other words, the present invention improves execution efficiency of information system, enhances preciseness of natural language sematic recognition, and improves conveniences of user's control of machines; it should be an invention by definitions.

The following are inventive points and brief descriptions corresponding to the aforementioned embodiments.

Inventive point 1, a semantic analysis method for a sentence (as shown in FIG. 19), comprising: (S101) receiving a sentence comprising a plurality of words; (S1102) searching one or more first words and one or more second words among the plurality of words according to multiple words (i.e. words Xs) and compatible words corresponding to each of the words (sets of FB(X)) stored in a database, wherein each of the first words are included in the words stored in the database, each of the second words are included in the compatible words stored in the database (the second word is a compatible word of the first word, for examples in the embodiment as shown in FIG. 1, apple ("ping guo") can be the first words, Fuji ("fu shi"), instance ("ge"), per kilogram ("mei gong jin"), dollar ("yuan") are the second words corresponding to apple; give ("gei") is the first word, plan ("ji hua") and tomorrow ("ming tian") are the second words corresponding to give ("gei"); (S1103) when one of the first words and one of the second words are corresponded in the database, a subject word data structure is generated by reduction, the subject word data structure includes the one of the first words and the one of the second words (the subject word data structures may be every brackets as shown in FIGS. 1 and 2); (S104) repeating the reduction step to generate the subject word data structure until all of the correspondences of the second words is found, such that at least one subject word data structure corresponding to the sentence is generated (each sentence at least has one subject word data structure, the first word of this subject word data structure can be a noun or a verb); (S105) if a plurality of subject word data structures is generated, searching for one subject verb data structure among the plurality of subject word data structures, wherein the first word of the subject verb data structure is a verb (where two or more subject word data structures are generated, the sentence should have at least one verb being the subject verb data structure); and (S106) generating a semantic structure (i.e., an incidence map, such as the data structure as a bracket at the right hand side shown in FIG. 2.), wherein the semantic structure comprises a verb frame corresponding to the subject verb data structure, wherein the plurality of subject word data structures is arranged according to the verb frame.

Inventive point 2, the semantic analysis method of the inventive point 1, wherein the second word is a clause comprising at least one subject word data structure. (An exemplary sentence is: "I watch a movie about a comet hits the earth" ("wo kan hui xing zhuang di qiu de dian ying"). The "a comet hits the earth" ("hui xing zhuang di qiu") is the clause. The movie ("dian ying") is the first word and the "a comet hits the earth" ("hui xing zhuang di qiu") are the second words. The verb frame is subject word (I)+verb (watch)+subject word (movie).)

Inventive point 3, the semantic analysis method of the inventive point 1, wherein the second word and the first word of one of the plurality of the subject word data structures in the sentence are arranged such that the second word is in front of the first word. (As the embodiment shown in FIG. 1, Fuji is in front of apple and descriptions related to Modifier+N and Modifier+N)

Inventive point 4, the semantic analysis method of the inventive point 1, wherein one of the plurality of subject word data structure comprises two or more of the second words (for example, a small multi-colored kitten ("yi zhi xiao hua mao"), small ("xiao") and multi-colored ("hua") are in front of kitten ("mao").

Inventive point 5, the semantic analysis method of the inventive point 4, wherein one "de" word is arranged between two of the second words in the sentence (for example, the modifier of Modifier+N includes a "de" word).

Inventive point 6, the semantic analysis method of the inventive point 4, wherein one of the second words in the sentence includes a positional word (time phrases and spatial phrases are introduced by positional words).

Inventive point 7, the semantic analysis method of the inventive point 1, wherein one of the plurality of subject word data structure further includes a quantifier, a time word, or a determiner-measure (such as 100 as shown in FIG. 1 and two, year, month, day, hour, minute, second, one, this, those and etc.)

Inventive point 8, the semantic analysis method of the inventive point 1, wherein a first word of a subject word data structure in the sentence is not immediately adjacent to a second word of the subject word data structure. (For example, attending psychiatric physician ("jing shen ke zhu zhi yi shi"), the word physician ("yi shi") is the first word, psychiatric ("jing shen ke") and attending ("zhu zhi") are both the second words. However, the psychiatric ("jing shen ke") is not immediately adjacent to physician ("yi shi") in Chinese.)

Inventive point 9, the semantic analysis method of the inventive point 1, wherein one of the words is a first label of a semantic classification tree. (For example, a label of apple may be fruit. An upper layer of the fruit label may be food in the semantic classification tree. The word X itself may be a semantic label.)

Inventive point 10, the semantic analysis method of the inventive point 1, wherein one of the compatible words is a second label of a semantic classification tree. (Compatible words in the FB(X) may be a semantic label.

Inventive point 11, a reduction method of subject words (as shown in FIG. 18), comprising: (S1101) receiving a plurality of words; (S1102) searching one or more first words and one or more second words among the plurality of words according to multiple words and compatible words corresponding to each of the words (sets of FB(X)) stored in a database, wherein each of the first words are included in the words stored in the database, each of the second words are included in the compatible words stored in the database; and (S1103) when one of the first words and one of the second words are corresponded in the database, a subject word data structure is generated by reduction, the subject word data structure includes the one of the first words and the one of the second words. (Please refer to description of the inventive point 1)

Inventive point 12, the reduction method of the inventive point 11, wherein the second word is a clause comprising at least one subject word data structure. (Please refer to description of the inventive point 2)

Inventive point 13, the reduction method of the inventive point 11, wherein the second word and the first word of one of the plurality of the subject word data structures in the sentence are arranged such that the second word is in front of the first word. (Please refer to description of the inventive point 3)

Inventive point 14, the reduction method of the inventive point 11, wherein one of the plurality of subject word data structure comprises two or more of the second words. (Please refer to description of the inventive point 4)

Inventive point 15, the reduction method of the inventive point 14, wherein one "de" word is arranged between two of the second words in the sentence. (Please refer to description of the inventive point 5)

Inventive point 16, the reduction method of the inventive point 14, wherein one of the second words in the sentence includes a positional word. (Please refer to description of the inventive point 6)

Inventive point 17, the reduction method of the inventive point 11, wherein one of the plurality of subject word data structure further includes a quantifier, a time word, or a determiner-measure. (Please refer to description of the inventive point 7)

Inventive point 18, the reduction method of the inventive point 11, wherein a first word of a subject word data structure is not immediately adjacent to a second word of the subject word data structure. (Please refer to description of the inventive point 8)

Inventive point 19, the reduction method of the inventive point 11, wherein one of the words is a first label of a semantic classification tree. (Please refer to description of the inventive point 9)

Inventive point 20, the reduction method of the inventive point 11, wherein one of the compatible words is a second label of a semantic classification tree. (Please refer to description of the inventive point 10)

Inventive point 21, the reduction method of the inventive point 11, wherein the database includes sets corresponding to gene appearances or structures, the words in these sets corresponding to gene appearances or structures includes structure word [Structure], the compatible words in these sets corresponding to gene appearance or structures includes head molecule word [Head_Mol], specifier word [Specifier], chemical word [Chemical], organ and tissue word [Organ_Tissue], or words related to protein sequences [Sequence], wherein the second words corresponding to the head molecule word [Head_Mol] and the specifier word [Specifier] are sequentially arranged behind the first word corresponding to the structure word [Structure] in the sentence, wherein the second words corresponding to the chemical word [Chemical], the organ/tissue word [Organ_Tissue] or the sequence word [Sequence] are arranged in front of the word corresponding to the structure word [Structure] in the sentence. (Please refer to the descriptions related to gene appearance/structure—Appearance)

Inventive point 22, the reduction method of the inventive point 11, wherein the database includes sets corresponding to gene functions, the words in the sets corresponding to gene functions include target organ word [Target_Organ], the compatible words in the sets corresponding to gene functions include function molecule word [Function_Mol], specifier word [Specifier] or organ/tissue word [Organ_Tissue], wherein the second words corresponding to the function molecule word [Function_Mol] and the specifier word [Specifier] are arranged sequentially behind the first word corresponding to the target organization word [Target_Organ] in the sentence, wherein the second words corresponding to the organization tissue word [Organ_Tissue] are arranged in front of the first words corresponding to the target organization word [Target_Organ] in the sentence.

Inventive point 23, the reduction method of the inventive point 11, wherein the database includes sets corresponding to gene functions, the words in the sets corresponding to gene functions include target chemical word [Target_Chem], the compatible words in the sets corresponding to gene function include function molecule word [Function_Mol], specifier word [Specifier], target molecule word [Target_Mol] word or chemical word [Chemical], wherein the second words corresponding to the function molecule word [Function_Mol] and the specifier word [Specifier] are arranged sequentially behind the first word corresponding to the target chemical word [Target_Chem] word in the sentence, wherein the second words corresponding to the target molecule word [Target_Mol] or the chemical word [Chemical] are arranged in front of the first word corresponding to the target chemical word [Target_Chem] word in the sentence.

Inventive point 24, the reduction method of the inventive point 23, wherein the database includes sets corresponding to target chemical, the target chemical word is corresponding to one of the sets corresponding to target chemical, the words in the sets corresponding to target chemical include the target molecule word [Target_Mol], the compatible words in the sets corresponding to target chemical include the chemical words [Chemical], wherein the second word corresponding to the chemical words [Chemical] are sequentially arranged behind the first word corresponding to the target molecule word [Target_Mol] in the sentence.

Inventive point 25, the reduction method of the inventive point 11, wherein the database includes sets corresponding to gene's target sequences, the words in the sets corresponding to gene's target sequences include target sequence words [Target_Seq], the compatible words in the sets corresponding to gene's target sequences include function molecule words [Function_Mol], specifier words [Specifier], wherein the second words corresponding to the function molecule word [Function_Mol] and the specifier word [Specifier] are sequentially arranged behind the first word corresponding to the target sequence word in the sequence, wherein the database includes sets corresponding to descriptions of gene's target sequence, the target sequence word is corresponding to one of the sets corresponding to descriptions of gene's target sequence, the words in the sets corresponding to descriptions of gene's target sequence include chemical words [Chemical], the compatible words in the sets corresponding to description of gene's target sequence include sequence modifier words [Seq_Mod] or sequence words [Sequence], wherein the second words corresponding to the sequence modifier word [Seq_Mod] or the sequence word [Sequences] are sequentially arranged behind the first word corresponding to the chemical word [Chemical], wherein the database includes sets corresponding to descriptions of function molecule, the function molecule word [Function_Mol] is corresponding to one of the sets of descriptions of function molecule, the words corresponding to the sets of descriptions of function molecule include target function words [Target_Function], the compatible words corresponding to the sets of descriptions of function molecule include head molecule words [Head_Mol], wherein the second word corresponding to the head molecule word [Head_Mol] is sequentially arranged behind the first word corresponding to the target function word in the sentence.

Inventive point 26, the reduction method of the inventive point 11, wherein the database includes sets corresponding to gene's target molecule, the words in the sets corresponding to gene's target molecule include target molecule words [Target_Mol], the compatible words in the sets corresponding to gene's target molecule include function molecule word [Function_Mol] and specifier word [Specifier], wherein the second words corresponding to the function molecule word [Function_Mol] and the specifier word [Specifier] are sequentially arranged behind the first word corresponding to the target molecule word [Target_Mol] in the sentence, wherein the database includes sets corresponding to target cell and function, the function molecule word [Function_Mol] is corresponding to one of the sets corresponding to target cell and function, the words in the sets corresponding to target cell and function include target cell words [Target_Cell], the compatible words in the sets corresponding to target cell and function include function object word [Fun_Obj], wherein the second words corresponding to the function object word [Fun_Obj] is sequentially arranged behind the first word corresponding to the target cell word [Target_Cell] in the sentence, wherein the database includes sets corresponding to descriptions of target cell and function, the function object word is corresponding to one of the sets corresponding to descriptions of target cell and function, the words in the sets corresponding to descriptions of target cell and function include target function object words [Target_Fun], the compatible words in the sets corresponding to descriptions of target cell and function include object molecule word [Obj_Mol], wherein the second word corresponding to the object molecule word [Obj_Mol] is sequentially behind the first word corresponding to the target function [Target_Fun] in the sentence.

Inventive point 27, the reduction method of the inventive point 11, wherein the database includes sets corresponding to gene expression diseases, the words in the sets corresponding to gene expression deceases include disease words [Disease], the compatible words in the sets corresponding to gene expression deceases include gene expression words [Gene_Ex] and specifier words [Specifier], wherein the second word corresponding to the specifier word [Specifier] is sequentially arranged in front of the first word corresponding to the disease word [Disease], wherein the database includes sets corresponding to gene expressions, the gene expression word [Gene_Ex] is corresponding to one of the sets corresponding to gene expressions, the words in the sets corresponding to gene expressions include gene symbol words [GeneSymbol], the compatible words in the sets corresponding to gene expressions include linking words [Linking], wherein the second word corresponding to the linking word [Linking] is sequentially arranged behind the first word corresponding to the gene symbol [GeneSymbol], wherein the database includes sets corresponding to disease descriptions, the disease word [Disease] is corresponding to one of the sets corresponding to gene descriptions, the words in the sets corresponding to disease descriptions include main disease words [Disease_Main], the compatible words in the sets corresponding to disease descriptions include suffix disease words [Disease_Suf], wherein the second word corresponding to the suffix disease word [Disease_Suf] is sequentially arrange behind the first word corresponding to the main disease word in the sentence.

Inventive point 28, the reduction method of the inventive point 11, wherein the database includes sets corresponding to gene expression diseases, the words in the sets corresponding to gene expression deceases include disease words [Disease], the compatible words in the sets corresponding to gene expression deceases include gene expression words [Gene_Ex] and specifier words [Specifier], wherein the second word corresponding to the specifier word [Specifier] is sequentially arranged in front of the first word corresponding to the disease word [Disease], wherein the database includes sets corresponding to gene expressions, the gene expression word [Gene_Ex] is corresponding to one of the sets corresponding to gene expressions, the words in the sets corresponding to gene expressions include gene symbol words [GeneSymbol], the compatible words in the sets corresponding to gene expressions include linking words [Linking], wherein the second word corresponding to the linking word [Linking] is sequentially arranged behind the first word corresponding to the gene symbol [GeneSymbol].

Inventive point 29, the reduction method of the inventive point 11, wherein the database includes sets corresponding to gene families, the words in the sets corresponding to gene families include gene family words [Gene_Fam], the compatible words in the sets corresponding to gene families include function molecule words [Function_Mol] and specifier words [Specifier], wherein the second word corresponding to the function molecule word [Function_Mol] or the specifier word [Specifier] is sequentially arranged behind the first word corresponding to the gene family word [Gene_Fam] in the sentence, wherein the database includes sets corresponding to function molecules, the function molecule word [Function_Mol] is corresponding to one of the sets corresponding to function molecules, the words in the sets of corresponding to function molecules include head molecule words [Head_Mol], the compatible words in the sets of corresponding to function molecules include chemical words [Chemical] and target function word [Target_Function], wherein the second word corresponding to the chemical word [Chemical] or the target function word [Target_Functon] is sequentially arranged in front of the first word corresponding to the head molecule word [Head_Mol] in the sentence.

Inventive point 30, the reduction method of the inventive point 11, wherein the database includes sets corresponding to gene homolog, the words in the sets corresponding to gene homolog include gene molecule words [Gene_Mol], the compatible words in the sets corresponding to gene homolog include head molecule word [Head_Mol], wherein the second word corresponding to the head molecule word [Head_Mol] is sequentially arranged behind the first word corresponding to the gene molecule word [Gene_Mol], wherein the database includes sets corresponding to gene molecules, the gene molecule word is corresponding to one of the sets corresponding to gene molecules, the words in the sets corresponding to gene molecules include species word [Species], the compatible words in the sets corresponding to gene molecules include gene symbol words [GeneSymbol] and object molecule words [Obj_Mol], wherein the second word corresponding to the gene symbol word [GeneSymbol] is sequentially arranged in front of the first word corresponding to the species word [Species], wherein the second word corresponding to the object molecule word [Obj_Mol] is sequentially arranged behind the first word corresponding to the species word [Species].

Inventive point 31, the reduction method of the inventive point 11, wherein the database includes sets corresponding to gene caused diseases, the words in the sets corresponding to gene caused diseases include disease word [Disease], the compatible words in the sets corresponding to gene caused diseases include head molecule words [Head_Mol], wherein the second word corresponding to the head molecule word is sequentially arranged behind the first word corresponding to the disease word [Disease] in the sentence, wherein the database includes sets corresponding to diseases, the disease words is corresponding to one of the sets corresponding to diseases, the words in the sets corresponding to diseases include disease name word [Disease_Name], the compatible words include disease stage words [Disease_Stage], organization words [Organ], and specifier words [Specifier], wherein the second word corresponding to the specifier word [Specifier] is sequentially arranged behind the first word corresponding to the disease name in the sentence, wherein the second word corresponding to the disease stage words [Disease_Stage] or the organization words [Organ]is sequentially arranged in front of the first word corresponding to the disease name in the sentence.

Inventive point 32, a natural language generation method (as shown in FIG. 17, please refer to paragraphs related generating natural language using FB), comprising: receiving a semantic structure (i.e., the incidence map generated in step 2502), wherein the semantic structure includes a verb frame, the verb frame further comprises multiple subject word data structures, wherein each of the subject word data structure comprises a first word and one or more second words corresponding to the first word; generating a sentence including multiple words according to the verb frame, wherein the sentence includes all of the first words of each of the subject word data structures (i.e., step 2503); and inserting the second word of each of the subject word data structures into a position corresponding to its corresponding first word in the sentence according to a relation between each of the second words in the subject word data structures and its corresponding first word (i.e., step 2504).

Inventive point 33, the natural language generation method of the inventive point 32, wherein there exists at least one subject verb data structures among the multiple subject word data structures, the first word included in the subject verb data structure is a verb, the verb frame is corresponding to the first word included in the subject verb data structure (step 3 is executed according to a frame of verb V).

Inventive point 34, the natural language generation method of the inventive point 32, further comprising: when one of the subject word data structure includes two or more of the second words, the sequence of these two second words inserted into the sentence is determined according to statistical frequencies or numbers of the two respective combinations of the second words and the first words found in training materials. (for example, the sequence of "xiao" and "hua" with regard to a small multi-colored kitten ("xiao hua mao") is determined according to statistical frequencies or numbers that "xiao hua mao" and "hua xiao mao" are found.)

Inventive point 35, the natural language generation method of the inventive point 32, further comprising inserting a "de" word between the second words in the sentence. (for examples, "yi zhi ke ai de xiao hua mao" and "yi zhi shen hui se de xiao mao")

Inventive point 36, the natural language generation method of the inventive point 32, further comprising: receiving the semantic structure in a first language, translating the first word and the second word in each of the subject word data structures included in the verb frame into the first and the seconds in a second language, wherein the generating step and the inserting step are performed in the second language (i.e., machine translation using FB)

Inventive point 37, an electronic system for semantic analysis of a sentence (the first collection of method inventive points implemented by the electronic system as shown in FIG. 16), comprising: a database system, for storing sets of words and compatible words corresponding to the words; an input device, for receiving a sentence including multiple words; and a computing device, coupled to the database system and the input device, for executing software instructions to fulfill the semantic analysis methods of one of the inventive points 1 through 10.

Inventive point 38, an electronic system for reduction of subject words (the second collection of method inventive points implemented by the electronic system as shown in FIG. 16), comprising: a database system, for storing sets of words and compatible words corresponding to the words; an input device, for receiving a sentence including multiple words; and a computing device, coupled to the database system and the input device, for executing software instructions to fulfill the semantic analysis methods of one of the inventive points 11 through 31.

Inventive point 39, an electronic system for natural language generation (the third collection of method inventive points implemented by the electronic system as shown in FIG. 16), comprising: an input device, for receiving a semantic structure; and a computing device, coupled to the database system and the input device, for executing software instructions to fulfill the semantic analysis methods of one of the inventive points 32 through 36.

Figure 20:
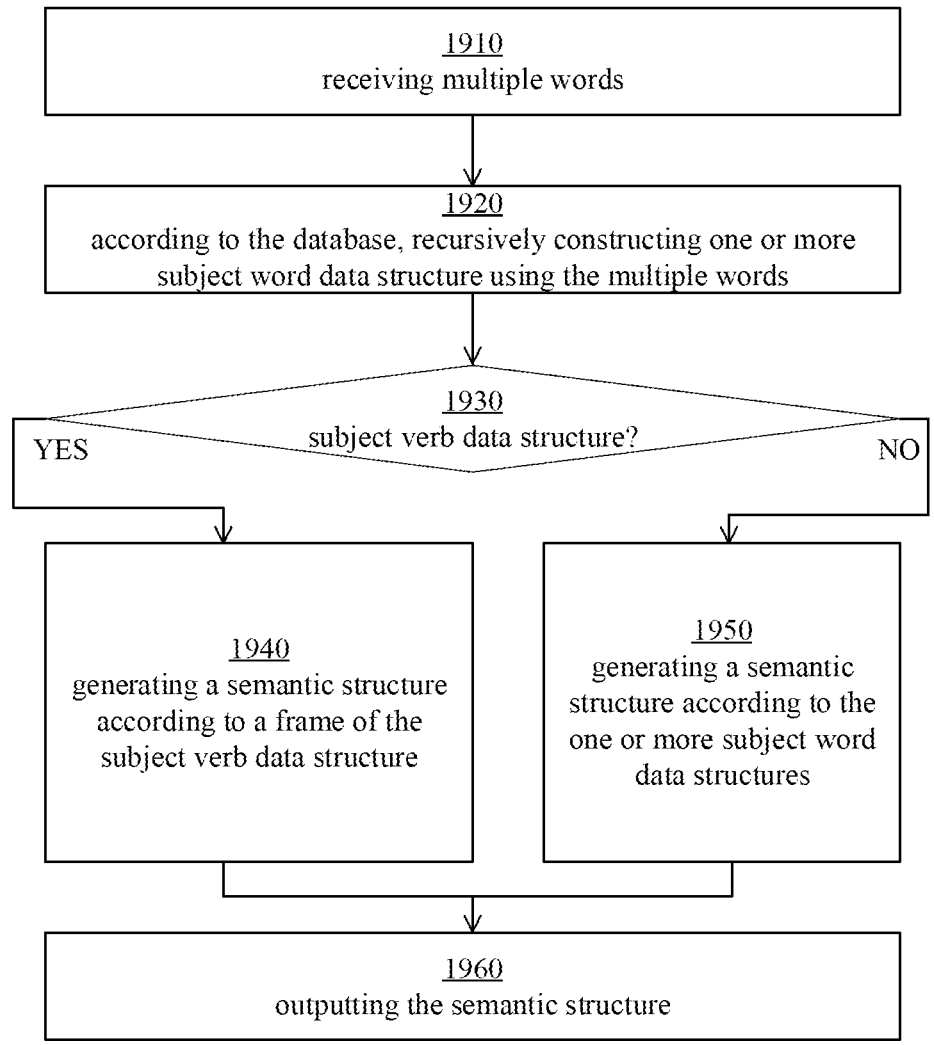
FIG. 20 depicts a flowchart diagram of a natural language processing method in accordance with an embodiment of the present invention.
Figure 21:
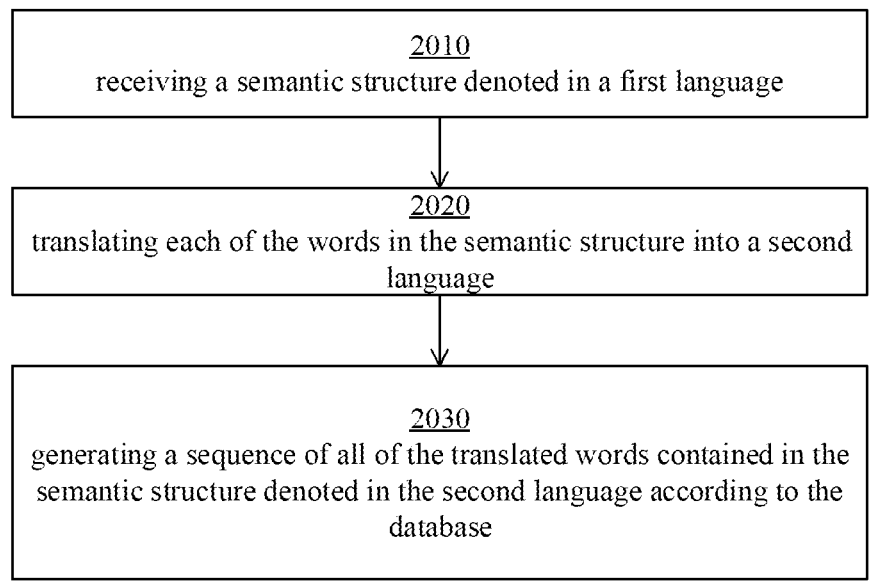
FIG. 21 depicts a flowchart diagram of a machine translation method in accordance with an embodiment of the present invention.
Figure 22:
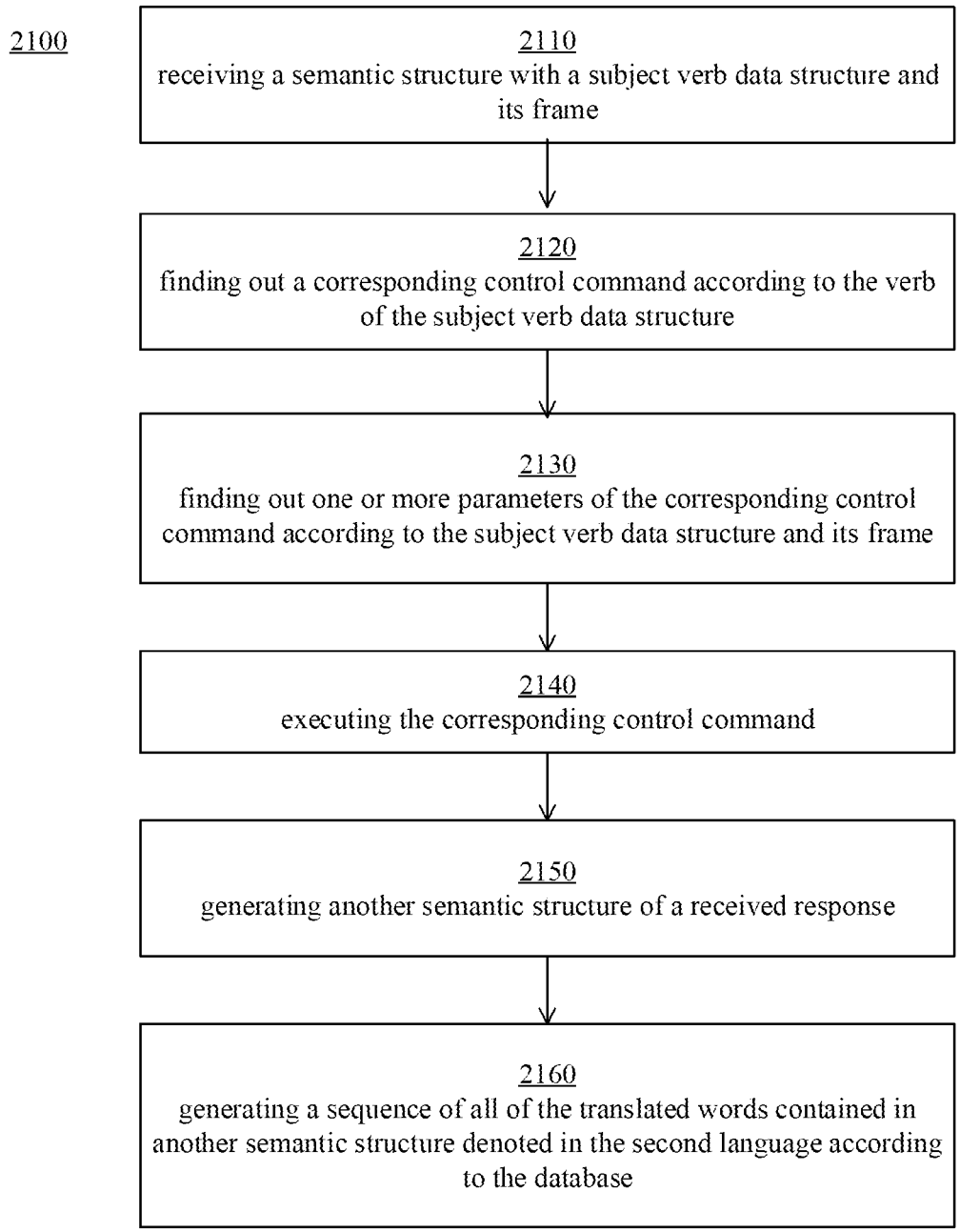
FIG. 22 depicts a flowchart diagram of a machine control method in accordance with an embodiment of the present invention.

Please refer to FIG. 20, which depicts a flowchart diagram of a natural language processing method 1900 in accordance with an embodiment of the present invention. The natural language processing method 1900 may be implemented by the electronic system as shown in FIG. 16 for generating semantic structures. The natural language processing method 1900 can be used to determine whether the inputs are grammatical or ungrammatical. The resulting semantic structures may be further forwarded to the methods as shown in FIGS. 21 and 22 for machine translation and control, respectively.

The natural language processing method 1900 may use the database system 1440. The database system 1440 may include a plurality of sets. Each of the plurality of sets includes one or more compatible relations. The compatible relation may be a word X and a set of its compatible words FB(X). Each of the plurality of sets may have one or more set properties. The set properties may include a language representing the word X, for examples, Chinese, English or any other language. The set properties may include a lexical category of the word X, for examples, verb, noun, adjective, adverb, etc.

A compatible word CX which is compatible to a word X may have one or more compatible properties. For examples, the compatible properties may include frequency, number or intensity of the occurrences that the word X and the compatible word CX are found in the training corpus. The compatible properties may further include domain, such as biological terms, computer science terms and etc. The compatible properties may include an order of the word X and the compatible word CX in the training corpus, for example, the compatible word CX is placed before or after the word X. The compatible properties may further denote that whether the compatible word is immediately adjacent to or indirectly adjacent to the word X In one embodiment, the compatible word X may be an event, a property or other information in the ontology of the word X. In another embodiment, the compatible word CX may be an event, a property or other information in the ontology of an upper layer of the word X. Already discussed, the ontology may be a structure described in reference E-HowNet [1]. Regarding to this kind of compatible word CX, it can refer to the aforementioned paragraphs related to "range of landmine". Its compatible properties may denote the respective layers of the ontology of the word X and the compatible CX as well as the relationship between the layers.

In one embodiment, the compatible word CX may be placed immediately ahead of the word X if the word X is a noun. In another information, there may exists a word "de" (的) between the compatible word CX and the word X if the word X is a noun in Chinese. The compatible property of the compatible word CX may denote that there is the word "de" behind the compatible word CX. As described, the compatible CX may be an adjective A, another noun N, verb V, etc. The compatible word CX may be a verb phrase, a time phrase or a spatial phrase consisting of multiple words.

In one embodiment, in order to perform machine translation, the compatible word CX of the word X in a first language can be a synonym in a second language. Take an example, the compatible word in English of the aforementioned word (處理) in Chinese is "handle". The compatible property can denote the second language, i.e., English. Because oral conversations are usually mixed of Chinese and English words, if the input words are represented by multiple languages, they may be translated into a same language at first, then find out the word X' represented in the second language as well as its compatible word CX' represented in the second language.

Although in the previous paragraph, it mentions the method that translates the word X into the word X' represented in the second language at first then finds its compatible word CX', the present invention can be applied to the embodiments where the word X and the compatible word CX are represented in different languages, respectively.

As described, one of the plurality of sets may include one word X and one or more compatible words CX. The one or more compatible words CX form the compatible word set FB(X) of the word X.

In one embodiment, in order to perform named entity recognition, the compatible word CX of the word X is not another word, but a concept tag. As described, regarding to human gene name recognition, each of the word X may be corresponding to a concept tag. Hence, when a compatible word CX is a concept tag, the compatible property of this compatible word CX can denote that the compatible relation is a concept tag.

In one embodiment, the database system 1440 may further include multiple label sequences for named entity recognition. Each of the label sequences includes multiple tags. Each of the tags may include one or more tags, or another label sequence for forming a recursive structure. In other words, label can be corresponding to any combination of label and label sequences. When a compatible word CX corresponding to a word X is a concept tag which is included in a label sequence, the word X may be taken as a component of the label sequence. When all tags included in the label sequence can be mapping to a word X, respectively, it can be determined that the sequence of these words is a named entity corresponding to the label sequence.

By the same way, time phrases such as year-month-day or hour-minute-second can be expressed as label sequences. Considering number as a concept tag, time phrases may be thus concluded. Similarly, spatial phrase or determiner-measure can also be expressed as label sequences.

In one embodiment, a word X may be a named entity, such as names or abbreviations of companies or institutions. The compatible word CX corresponding to the word X is also a concept label (label of institutional name). In addition to the aforementioned gene names, the present invention is also applicable to specified institutional name recognition. For example, the following label sequence may be used to denote a full name of a school: [SUPERIOR_INSTITUTION_ESTIBILISHED] [NAMED_ENTITY] [SCHOOL_IN_HIERARCHY]. In a full name of "municipal yu-nong primary school" ("Shi li yu nong guo min xiao xue"), "municipal" ("Shi li") belongs to the label [SUPERIOR_INSTITUTION_ESTIBILISHED] and "primary school" ("guo min xiao xue") belongs to the label [SCHOOL_IN_HIERARCHY]. Therefore, "yu-nong" is mapped to the concept label of named entity.

Before performing step 1910, the database system 1440 is already available. Next, performing step 1910, receiving multiple words. These words may form a sentence or a noun phrase. If they form a sentence, at least one verb is included in these words, i.e., an imperative sentence. If there exists a combination of a subject and a verb, a simple sentence is formed.

In one embodiment, the multiple words received at step 1910 may be constructed by multiple syllables, for examples, the aforementioned sequences of zhuyin, pinyin, or speech signal. Multiple syllables may form one or more words.

Step 1920: according to the database, recursively constructing one or more subject word data structure using the multiple words. As elaborated in the embodiment as shown in FIGS. 1 and 2, one or continuous words among the multiple words can be mapping to a word X or a compatible word CX in the database. Next, a dependence parse tree may be recursively constructed by these words. A word among these words may be a first word corresponding to a word X in a set or it may be a second word corresponding to a compatible word CX in the same set. Thus, when two of the words match a compatible property, a dependence parse tree corresponding to the first word may be constructed. Then the second word is reduced to a tree structure of the dependence parse tree of the first word.

In one embodiment, the second word can be reduced to the dependence parse tree of the first word according to a relation in the ontology. It is to say that the second word is not a compatible word of the first word in the database system. However, since the second word and a compatible word of the first word belong to an identical class in the ontology, a weak compatible relation between the second word and the first word can be dynamically established. In other words, the second word can be reduced to the dependence parse tree of the first word.

In one embodiment, according to concept tags which are mapped to by some words, which can be collectively deduced to label sequence or concept sequence of named entity, time phrase, spatial phrase. For examples, the aforementioned human gene names.

After they are reduced to multiple dependence parse trees, which can be further recursively reduced to one or more subject word data structures. As described, if the subject word of a subject word data structure is a noun or a verb, the subject word data structure may include a dependence parse tree structure of the noun or the verb. In the embodiment as shown in FIG. 1, two dependence parse tree structures having "apple" as their first word are reduced and combined into a single dependence parse tree structure. In the embodiment as shown in FIG. 2, a dependence parse tree structures having "gei" as the first word can be found.

Step 1920 may include several sub steps of reduction. In the programming languages for realizing this method, such as C, C++, Java, or etc., one or more of the sub steps of reduction may be recursively executed for generating multi-layer dependence parse tree structures. One of these sub steps may be configured to generate a part of the dependence parse tree according to compatible relations between words X and their FB(X) sets stored in the database. Another one of these sub steps of reduction may be configured to dynamically or statically generate a part of the dependence parse tree according to hierarchical level relations in the ontology specified in the compatible properties. One of these sub steps of reduction may be configured to generate a part of the dependence parse tree according to label sequence and concept labels of the compatible properties stored in the database.

When there are ambiguities because of multiple plausible dependence parse trees may be generated, the intensities of these plausible dependence parse trees can be determined according to frequencies, numbers or intensities denoted in the compatible properties. If a sum of frequencies, numbers or intensities of multiple compatible relations contained in a first dependence parse tree is larger than that of a second dependence parse tree, it may be determined that the intensity of the first dependence parse tree is larger than the intensity of the second dependence parse tree. When computing resource or time is limited such that it is not afforded to process all of the plausible dependence parse trees, a dependence parse tree with the largest intensity may be chosen for further processing.

For example, when multiple syllables are received at step 1910, multiple plausible combinations of words may be generated. Each of the plausible combination may be used to generate a dependence parse tree. Thus ambiguities are generated. In one example, when the inputted pinyin syllables are "qi yi", three candidate words are "divergence", "strange" and "ambiguities". At step 1920, these three candidate words may be used for reduction sub steps, respectively, for determining whether they can be compatible with other words to generate dependence parse trees. If multiple dependence parse trees may be generated in the reductions according to multiple candidate words, it is still required to determine which one of the candidate words is correct according to the intensities of these dependence parse trees.

Step 1930: finding out a subject verb data structure among the one or more subject word data structure. In the embodiment as shown in FIG. 2, a subject verb data structure headed by "gei" can be found. Since a complete sentence may not be formed by the received words, the flow goes to step 1940 if the subject verb data structure is found; otherwise, the flow goes to step 1950.

In one embodiment, there may be multiple verbs among the received words because a verb phrase or clause may be included in a sentence. Since the verb phrase or clause can be reduced to another subject word data structure at step 1930, a forest including multiple subject word data structures should have one independent subject verb data structure. If there are two independent subject verb data structures, it may be caused by aforementioned error segmentation. The flow may go back to take another combination of words until the verb phrase or clause can be reduced into one of the subject word data structures.

Step 1940: generating a semantic structure according to a frame of the subject verb data structure. In the embodiment as shown in FIG. 2, a tree structure of semantic structure is generated according to the frame of "gei" word. The tree structure of semantic structure may be named as an instance map or incidence map.

Step 1950: generating a semantic structure according to the one or more subject word data structures. In the embodiment as shown in FIG. 1, a semantic structure is generated to modify "apple" according to the dependence parse tree headed by "apple". Usually, if a subject verb data structure can be found, the semantic structure should contain only one subject word data structure. If there are many subject word data structures, a forest structure of semantic structure can be formed.

No matter the inputted are words or syllables in any language, the generated semantic structure should include all of the inputted. If there is any inputted not included in the semantic structure, the semantic structure may be wrong.

In one embodiment, if multiple semantic structures are generated at steps 1940 or 1950, their intensities can be determined according to frequencies, numbers of intensity of compatible properties in these semantic structures, respectively. If a sum of frequencies, numbers or intensities of multiple compatible relations contained in a first semantic structure is larger than that of a second semantic structure, it may be determined that the intensity or accuracy of the first semantic structure is larger than that of the second semantic structure. When computing resource or time is limited such that it is not afforded to compare all of the semantic structures with context, a semantic structure with the largest intensity or the most accurate may be outputted.

Please refer to FIG. 21, which depicts a flowchart diagram of a machine translation method 2000 in accordance with an embodiment of the present invention. The machine translation method 2000 may be implemented by the electronic system as shown in FIG. 16. The machine translation method 2000 may use the database system 1440 and a translation dictionary. The database system 1440 includes the aforementioned plurality of sets. And the translation dictionary may include compatible words representing in a first and a second languages.

Step 2010: receiving a semantic structure denoted in a first language. The semantic structure may be generated at steps 1940 or 1950. The words included in the semantic structure are denoted in the first language.

Step 2020: translating each of the words in the semantic structure into a second language. As elaborated, in one embodiment, if there is a word X denoted in the first language and its compatible word X' denoted in the second language, the word X contained in the semantic structure can be translated into its compatible word X'. In another embodiment, a word in the semantic structure can be translated into a corresponding word denoted in the second language according to the dictionary. Because the sets recited in the database system 1440 may have compatible properties of domains, it is easier to find more appropriated word to translate according to the domain of the context.

Step 2030: generating a sequence of all of the translated words contained in the semantic structure denoted in the second language according to the database. Since the compatible properties may denote orders of words and their compatible words, whether they are immediately adjacent or not, and frequencies, numbers or intensities of occurrences of the compatible relations in the training corpus, the sequence of all words in the semantic structure can be determined accordingly.

When the semantic structure represents a complete sentence, the order to words in this sentence may be determined according to the frame of the subject verb data structure contained in the semantic structure. For examples, according to verb frame in Japanese, the translation of "I eat breakfast" is "I breakfast eat" where the order of verb and object is interchanged. In other words, outputting a sequence of words arranged in a semantic structure may prevent grammatical errors.

Moreover, second language native speaking people may think that the results translated according to the frequencies, number or intensities of occurrences of the first and the second words in the training corpus are more fluently. And the probabilities of generating sentences that do not make sense are decreased. If a word is corresponding to multiple translated words, it can further determine which one of the words is the most accurate according to the domains denoted in the compatible properties.

Please refer to FIG. 22, which depicts a flowchart diagram of a machine control method 2100 in accordance with an embodiment of the present invention. The machine control method 2100 can be implemented by the electronic system as shown in FIG. 16.

Step 2110: receiving a semantic structure with a subject verb data structure and its frame. The semantic structure may be generated at step 1940 or 1950.

Step 2120: finding out a corresponding control command according to the verb of the subject verb data structure. For example, it is mentioned that a controller of intelligent family receives user's voice command: start the air conditioner of living room to 26 degree. The word "start" is the verb of the semantic structure. Its corresponding control command is to power on an air conditioner.

Optional step 2130: finding out one or more parameters of the corresponding control command according to the subject verb data structure and its frame. In the example mentioned in the previous paragraph, the object of the verb "start" is the air conditioner in the living room, which is a parameter of the control command. Another parameter of the control command is 26 degree which means that the target temperature being set is 26 degree.

Step 2140: executing the corresponding control command.

Optional step 2150: generating another semantic structure of a received response. After executing the command, the target machine may respond with a message. The message returned from the machine is usually structural. Hence, it can be reformatted into another semantic structure according to predetermined static mappings. For example, when the machine reports a numeric response code, a corresponding text message could be mapped according to the numeric response code and placed into the another semantic structure.

Optional step 2160: generating a sequence of all of the translated words contained in another semantic structure denoted in the second language according to the database. This step is similar to step 2030 but without the translation.

According to one aspect of the present application, providing a natural language processing method, comprising: receiving multiple input words; and reducing the multiple words into one or more subject word data structures according to sets stored in a database, wherein one of the subject word data structures includes a first input word and a second input words among the input words, wherein one of the sets includes a compatible relation between the first input word and the second input word, wherein the compatible relation between the first input word and the second word includes a compatible property for denoting an intensity representing occurrences of the first input word and the second word in a training corpus.

In one embodiment, in order to reduce a subject word with multiple compatible words, wherein one of the subject word data structure includes a third input word among the input words, wherein another one of the sets includes a compatible relation between the second input word and the third input word, wherein the subject word data structure includes a tree structure, the first input word is a root node of the tree structure, the second input word is a child node of the first input word, the third input word is a child node of the second input word.

In one embodiment, in order to reduce a subject word with phrase or clause, wherein one of the subject word data structure includes a third input word among the input words, wherein another one of the sets includes a compatible relation between the first input word and the third input word, wherein the subject word data structure includes a tree structure, the first input word is a root node of the tree structure, the second input word is a child node of the first input word, the third input word is a child node of the first input word.

In one embodiment, in order to supplement insufficient compatible relations stored in the database, ontology is used to form compatible relations, wherein another one of the subject word data structure includes a third input word and a fourth input word among the input words, wherein the third input word and the four input word are respectively corresponding to a same level or adjacent hierarchical levels of ontology, wherein the sets do not include a compatible relation between the third input word and the fourth input word.

In one embodiment, in order to recognize and reduce named entity, time phrase, spatial phrase or fixed formatted context, wherein another one of the subject data word structures includes a named entity which sequentially consisting of a third input word and a fourth input word among the input words, wherein a third set of the sets includes a compatible relation between the third input word and a third label, a fourth set of the sets includes a compatible relation between the fourth input word and a fourth label, the database further includes a label sequence which is an orderly sequence consisting of the third label and the fourth label.

In one embodiment, in order to recognize and reduce recursively formatted named entity, time phrase, spatial phrase or fixed formatted context, wherein another one of the subject data word structures includes a named entity which sequentially consisting of a third input word, a fourth input word and a fifth input word among the input words, wherein a third set of the sets includes a compatible relation between the third input word and a third label, a fourth set of the sets includes a compatible relation between the fourth input word and a fourth label, a fifth set of the sets includes a compatible relation between the fifth input word and a fifth label, the database further includes a first label sequence and a second label sequence, the first label sequence is an orderly sequence consisting of the third label and the second label sequence, the second sequence is an orderly sequence consisting of the fourth label and the fifth label.

In one embodiment, in order to reduce named entity with unknown words, wherein another one of the subject data word structures includes a named entity which sequentially consisting of a third input word, a fourth input word and a fifth input word among the input words, wherein a third set of the sets includes a compatible relation between the third input word and a third label, a fifth set of the sets includes a compatible relation between the fifth input word and a fifth label, the database further includes a first label sequence which is an orderly sequence consisting of the third label, the fourth label and the fifth label, wherein the fourth input word is not included in any compatible relations in the sets.

In one embodiment, in order to perform more precisely semantic analysis and machine translation and to supplement insufficient compatible relations stored in the database, wherein one of the sets further includes a word, one or more compatible words compatible to the word, and one or any combination of following set properties: a set property denoting a lexical category of the word; a set property denoting language of the word; and a set property denoting a level of ontology where the word belongs to.

In one embodiment, in order to perform more precisely semantic analysis and machine translation and to supplement insufficient compatible relations stored in the database, wherein a compatible relation of one of the sets further includes one or any combination of following compatible properties: a compatible property denoting an order of sequence of a word and its compatible word in the compatible relation; a compatible property denoting whether the word and the compatible word have to be immediately adjacent; a compatible property denoting a domain of the word and its compatible word; a compatible property denoting language of the compatible word; a compatible property denoting whether the compatible word is a label; a compatible property denoting a level of ontology where the compatible belongs to; and a compatible property denoting a lexical category of the compatible word.

In one embodiment, in order to perform more precisely semantic analysis by using semantic structure, the natural language processing method further comprising: finding out a subject verb data structure among the one or more subject word data structures; if the subject verb data structure is found, generating a tree structure of a semantic structure according to a frame of the subject verb data structure; and if the subject verb data structure is not found, generating a forest structure of the semantic structure which includes all of the one or more subject word data structures.

In one embodiment, the instant application can utilize words denoted in two different languages, wherein at least one of the input words is denoted in a first language and another one of the input words is denoted in a second language.

In one embodiment, in order to perform machine translation, the natural language processing method further comprising: translating each of the input words denoted in a first language in the semantic structure into input words denoted in a second language, respectively; and generating a sequence of the input words denoted in the second language in the semantic structure according to compatible relations of sets which include the input words denoted in the second language.

In one embodiment, in order to perform more precisely machine translation, wherein one of the sets includes a compatible relation of the input word denoted in the first language and the input word denoted in the second language, wherein the translating step is according to the compatible relation of the input word denoted in the first language and the input word denoted in the second language.

In one embodiment, in order to resolve ambiguous dependence parse trees according to intensities of compatible relations, wherein another one of the sets includes a compatible relation of the first input word and a third input word among the input words, the compatible relation of the first input word and the third input word includes a compatible property for denoting a second intensity representing occurrences of the first input word and the third word in the training corpus, wherein the natural language processing method further comprising: determining which one of the intensity and the second intensity is larger; wherein one of the one or more subject word data structure is consisted of the first and the second input words if the intensity is larger than the second intensity; and wherein one of the one or more subject word data structure is consisted of the first and the third input words if the second intensity is larger than the intensity.

In one embodiment, in order to satisfy a requirement that the semantic structure has to include all of the input words, the natural language processing method further comprising: forming another one of the subject word data structures which is consisted of the third input word if the intensity is larger than the second intensity.

In one embodiment, in order to meet voice input or syllable input, wherein the input words include syllables, the first input word is represented by the syllables.

In one embodiment, in order to take voice inputted command, the natural language processing method further comprising: determining whether a frame of verb is included in the semantic structure; finding out a control command corresponding to a verb of the frame if it is determined that the frame is included in the semantic structure; and executing the control command.

In one embodiment, in order to take more complicated voice inputted command, the natural language processing method further comprising: finding out one or more parameter of the control command in the semantic structure according to the frame before the executing step.

In one embodiment, in order to respond user in natural language, the natural language processing method further comprising: receiving a response message after the executing of the control command; forming a semantic structure of the response message; and generating a sequence of all of input words in the semantic structure of the response message.

According to one aspect of the present application, providing a computing apparatus for natural language processing, configured to execute instructions stored in a non-volatile memory for realizing the natural language processing methods.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A natural language processing method, comprising:
receiving multiple input words, wherein the multiple input words are voice inputted from an input device; and
reducing, by a computing device, the multiple input words into one or more subject word data structures according to sets stored in a database system,
wherein one of the subject word data structures includes a first input word and a second input words among the input words,
wherein one of the sets includes a compatible relation between the first input word and the second input word,
wherein the compatible relation between the first input word and the second word includes a compatible property for denoting an intensity representing occurrences of the first input word and the second word in a training corpus,
wherein a compatible relation of one of the sets further includes one or any combination of following compatible properties:
a compatible property denoting an order of sequence of a word and its compatible word in the compatible relation;
a compatible property denoting whether the word and the compatible word have to be immediately adjacent;
a compatible property denoting a domain of the word and its compatible word;
a compatible property denoting language of the compatible word;
a compatible property denoting whether the compatible word is a label;
a compatible property denoting a level of ontology where the compatible belongs to; and
a compatible property denoting a lexical category of the compatible word.

2. The natural language processing method as claimed in claim 1, wherein one of the subject word data structures includes a third input word among the input words,
wherein another one of the sets includes a compatible relation between the second input word and the third input word,
wherein the subject word data structure includes a tree structure, the first input word is a root node of the tree structure, the second input word is a child node of the first input word, the third input word is a child node of the second input word.

3. The natural language processing method as claimed in claim 1, wherein one of the subject word data structures includes a third input word among the input words, wherein another one of the sets includes a compatible relation between the first input word and the third input word, wherein the subject word data structure includes a tree structure, the first input word is a root node of the tree structure, the second input word is a child node of the first input word, the third input word is a child node of the first input word.

4. The natural language processing method as claimed in claim 1, wherein another one of the subject word data structures includes a third input word and a fourth input word among the input words, wherein the third input word and the fourth input word are respectively corresponding to a same level or adjacent hierarchical levels of ontology, wherein the sets do not include a compatible relation between the third input word and the fourth input word.

5. The natural language processing method as claimed in claim 1, wherein another one of the subject data word structures includes a named entity which sequentially consisting of a third input word and a fourth input word among the input words, wherein a third set of the sets includes a compatible relation between the third input word and a third label, a fourth set of the sets includes a compatible relation between the fourth input word and a fourth label, the database system further includes a label sequence which is an orderly sequence consisting of the third label and the fourth label.

6. The natural language processing method as claimed in claim 1, wherein another one of the subject data word structures includes a named entity which sequentially consisting of a third input word, a fourth input word and a fifth input word among the input words, wherein a third set of the sets includes a compatible relation between the third input word and a third label, a fourth set of the sets includes a compatible relation between the fourth input word and a fourth label, a fifth set of the sets includes a compatible relation between the fifth input word and a fifth label, the database system further includes a first label sequence and a second label sequence, the first label sequence is an orderly sequence consisting of the third label and the second label sequence, the second sequence is an orderly sequence consisting of the fourth label and the fifth label.

7. The natural language processing method as claimed in claim 1, wherein another one of the subject data word structures includes a named entity which sequentially consisting of a third input word, a fourth input word and a fifth input word among the input words, wherein a third set of the sets includes a compatible relation between the third input word and a third label, a fifth set of the sets includes a compatible relation between the fifth input word and a fifth label, the database system further includes a first label sequence which is an orderly sequence consisting of the third label, a fourth label and the fifth label, wherein the fourth input word is not included in any compatible relations in the sets.

8. The natural language processing method as claimed in claim 1, wherein one of the sets further includes a word, one or more compatible words compatible to the word, and one or any combination of following set properties:
a set property denoting a lexical category of the word;
a set property denoting language of the word; and
a set property denoting a level of ontology where the word belongs to.

9. The natural language processing method as claimed in claim 1, further comprising:
finding out a subject verb data structure among the one or more subject word data structures;
if the subject verb data structure is found, generating a tree structure of a semantic structure according to a frame of the subject verb data structure; and
if the subject verb data structure is not found, generating a forest structure of the semantic structure which includes all of the one or more subject word data structures.

10. The natural language processing method as claimed in claim 9, further comprising:
translating each of the input words denoted in a first language in the semantic structure into input words denoted in a second language, respectively; and
generating a sequence of the input words denoted in the second language in the semantic structure according to compatible relations of sets which include the input words denoted in the second language.

11. The natural language processing method as claimed in claim 10, wherein one of the sets includes a compatible relation of the input word denoted in the first language and the input word denoted in the second language, wherein the translating step is according to the compatible relation of the input word denoted in the first language and the input word denoted in the second language.

12. The natural language processing method as claimed in claim 9, further comprising:
determining whether a frame of verb is included in the semantic structure;
finding out a control command corresponding to a verb of the frame if it is determined that the frame is included in the semantic structure; and
executing the control command.

13. The natural language processing method as claimed in claim 12, further comprising:
finding out one or more parameter of the control command in the semantic structure according to the frame before the executing step.

14. The natural language processing method as claimed in claim 12, further comprising:
receiving a response message after the executing of the control command;
forming a semantic structure of the response message; and
generating a sequence of all of input words in the semantic structure of the response message.

15. The natural language processing method as claimed in claim 1, wherein at least one of the input words is denoted in a first language and another one of the input words is denoted in a second language.

16. The natural language processing method as claimed in claim 1, wherein another one of the sets includes a compatible relation of the first input word and a third input word among the input words, the compatible relation of the first input word and the third input word includes a compatible property for denoting a second intensity representing occurrences of the first input word and the third word in the training corpus, wherein the natural language processing method further comprising:
determining which one of the intensity and the second intensity is larger;
wherein one of the one or more subject word data structure is consisted of the first and the second input words if the intensity is larger than the second intensity; and wherein one of the one or more subject word data structure is consisted of the first and the third input words if the second intensity is larger than the intensity.

17. The natural language processing method as claimed in claim 16, further comprising:
   forming another one of the subject word data structures which is consisted of the third input word if the intensity is larger than the second intensity.

18. The natural language processing method as claimed in claim 1, wherein the input words include syllables, the first input word is represented by the syllables.

19. A computing device for natural language processing, configured to execute instructions stored in a memory device for realizing the natural language processing method recited in claim 1.

20. The natural language processing method as claimed in claim 1, wherein the database system and the computing device are located in different computer systems interconnected via wired or wireless network.

* * * * *